(12) United States Patent
Malladi

(10) Patent No.: US 8,174,995 B2
(45) Date of Patent: May 8, 2012

(54) METHOD AND APPARATUS FOR FLEXIBLE PILOT PATTERN

(75) Inventor: Durga Prasad Malladi, San Diego, CA (US)

(73) Assignee: QUALCOM, Incorporated, San Diego, CA (US)

( * ) Notice: Subject to any disclaimer, the term of this patent is extended or adjusted under 35 U.S.C. 154(b) by 782 days.

(21) Appl. No.: 11/841,771

(22) Filed: Aug. 20, 2007

(65) Prior Publication Data

US 2008/0089312 A1 Apr. 17, 2008

Related U.S. Application Data

(60) Provisional application No. 60/839,357, filed on Aug. 21, 2006.

(51) Int. Cl.
*H04B 3/10* (2006.01)
*G06F 11/00* (2006.01)
*H04J 3/08* (2006.01)
*H04J 3/06* (2006.01)
*H04W 4/00* (2009.01)

(52) U.S. Cl. ........ 370/252; 370/491; 370/501; 370/329; 370/503

(58) Field of Classification Search .................. 370/310, 370/328, 338, 329, 350, 491, 500, 503
See application file for complete search history.

(56) References Cited

U.S. PATENT DOCUMENTS

| | | | |
|---|---|---|---|
| 6,122,246 A * | 9/2000 | Marchok et al. | 370/208 |
| 7,023,928 B2 * | 4/2006 | Laroia et al. | 375/260 |
| 7,242,722 B2 * | 7/2007 | Krauss et al. | 375/260 |
| 7,729,305 B2 * | 6/2010 | Cho et al. | 370/328 |
| 7,783,293 B2 * | 8/2010 | Tujkovic et al. | 455/450 |
| 2003/0174643 A1 * | 9/2003 | Ro et al. | 370/210 |
| 2004/0111520 A1 | 6/2004 | Krantz et al. | |
| 2004/0141488 A1 | 7/2004 | Kim et al. | |
| 2005/0094552 A1 * | 5/2005 | Abe et al. | 370/208 |
| 2005/0122928 A1 * | 6/2005 | Vijayan et al. | 370/312 |
| 2005/0190728 A1 * | 9/2005 | Han et al. | 370/335 |
| 2006/0015590 A1 | 1/2006 | Patil et al. | |
| 2006/0067284 A1 | 3/2006 | Borella | |
| 2006/0098569 A1 * | 5/2006 | Han et al. | 370/208 |
| 2006/0146948 A1 * | 7/2006 | Park et al. | 375/260 |

(Continued)

FOREIGN PATENT DOCUMENTS

EP 1542488 A1 6/2005

(Continued)

OTHER PUBLICATIONS

International Search Report—PCT/US07/076387, International Search Authority—European Patent Office—Apr. 8, 2008.

(Continued)

*Primary Examiner* — Warner Wong
(74) *Attorney, Agent, or Firm* — Paul Kuo; Larry Moskowitz

(57) ABSTRACT

In accordance an aspect, a method for a wireless communication system, determining a location in time of a sub-frame when SFN transmission for data will occur, determining a first transmission pattern and a second transmission pattern for reference signals, wherein the transmission patterns indicate the symbols and tones of a sub-frame to use for reference signals, selecting for use, between the first transmission pattern and second transmission pattern for reference signals depending on whether SFN data will be transmitted in the sub-frame, and broadcasting information about the selected transmission pattern prior to use thereof.

77 Claims, 15 Drawing Sheets

U.S. PATENT DOCUMENTS

| | | | |
|---|---|---|---|
| 2006/0185012 A1 | 8/2006 | Olivereau et al. | |
| 2006/0209670 A1* | 9/2006 | Gorokhov et al. | 370/208 |
| 2006/0209732 A1* | 9/2006 | Gorokhov et al. | 370/310 |
| 2006/0280113 A1* | 12/2006 | Huo | 370/208 |
| 2007/0008924 A1 | 1/2007 | Moran | |
| 2007/0070945 A1* | 3/2007 | Wang et al. | 370/329 |
| 2007/0104174 A1* | 5/2007 | Nystrom et al. | 370/343 |
| 2007/0248037 A1* | 10/2007 | Stewart et al. | 370/328 |
| 2007/0248045 A1* | 10/2007 | Nagaraj | 370/329 |
| 2010/0284488 A1* | 11/2010 | Murakami et al. | 375/295 |
| 2011/0064039 A1* | 3/2011 | Sutivong et al. | 370/329 |

FOREIGN PATENT DOCUMENTS

| | | | |
|---|---|---|---|
| EP | 1677480 A1 | 7/2006 | |
| GB | 2415872 | 1/2006 | |
| RU | 2261812 C2 | 5/2005 | |
| RU | 2006110038 | 8/2006 | |
| TW | 254546 B | 5/2006 | |
| WO | WO2005/022792 | * | 8/2004 |
| WO | 2005022792 | 3/2005 | |
| WO | WO2005122517 | 12/2005 | |
| WO | WO2006059216 A1 | 6/2006 | |

OTHER PUBLICATIONS

Ala-Laurila, J., et al., "Wireless LAN Access Network Architecture for Mobile Operators", IEEE Communications Magazine, vol. 39, issue 11, 2001, pp. 82-89.

Graveman RFG Security R et al.: "Using IPsec to Secure IPv6-in-IPv4 Tunnels; draftietf-v6ops-ipsec-tunnels-02.txt", IETF Standard-Working-Draft, Internet Engineering Task Force, IETF, CH, [Mar. 6, 2006], ISSN 0000-0004. XP015044216.

Kaufman C. et al.: "Internet Key Exchange (IKEv2) Protocol; RFC 4306", IETF Standard, Internet Engineering Task Force, IETF, Dec. 2005, XP015043225.

Montenegro, G., Editor, "Reverse Tunneling for Mobile IP", IETF, Network Working Group, RFC 2344, May 1998.

"Project No. 3-0174-200, proposed creation of a new TIA Standard, cdma2000 (R) Wireless Local Area Network Interworking, (if approved, to be published as TIA-1050-200); SP-3-0174-200", EIATIA Drafts, Telecommunications Industry Association, Arlington, VA, US, [May 19, 2006). XP017005491.

Translation of Office Action in Russian application 009110196 corresponding to U.S. Appl. No. 11/840,735, citing WO2006059216, RU2006110038, US20060067284 and US20060015590 dated Jan. 21, 2011.

Written Opinion—PCT/US2007/076387, International Search Authority, European Patent Office, Apr. 8, 2008.

J. Wiljakka, ed., "Analysis on IPv6 Transition in Third Generation Partnership Project (3GPP) Networks", Network Working Group Request for Comments: 4215, [online], Oct. 2005, Category: Informational,[retrieved on Sep. 6, 2011]. Retrieved from the Internet, URL, <http://tools.ietf.org/html/rfc4215>.

Makoto Otani et al., "Development of a Network User Authentication System for IPv/IPv6 Dual Stack Network," Journal of the Information Processing Society of Japan, Apr. 15, 2006, vol. 47, No. 4, pp. 1146-1156.

Taiwan Search Report—TW096130990—TIPO—Aug. 2, 2011.

Tatsuya Baba, "Learn before Creation of VPN Environment, VPN that We Want To Know, 3rd. Use of IP sec in Remote Access VPN," Network World, IDG Japan, May 1, 2004, vol. 9, No. 5, pp. 132-138.

"Access to Operator Service and Mobility for WLAN Interworking",3rd Generation Partnership Project 2 "3GPP2", [online], Apr. 26, 2006, 3GPP2 X.P0028-200, Version 0.2, [retrieved on Sep. 7, 2011]. Retrieved from the Internet, URL, <.http://ftp.3gpp2.org/TSGX/Working/2006/2006-04/TR45.6-2006-04-KansasCity/2006042608%20TIA-1050%20WLAN%20%283%20parts%29/X31-20060327-xxx%20X.P0028-200%20v0.2%20for%202nd%20R&F%20%28Clean%29.pdf>.

\* cited by examiner

METHOD AND APPARATUS FOR FLEXIBLE PILOT PATTERN

CROSS-REFERENCE TO RELATED APPLICATION

This application claims the benefit of U.S. Provisional Patent application Ser. No. 60/839,357 entitled "METHOD AND APPARATUS FOR FLEXIBLE PILOT PATTERN" which was filed Aug. 21, 2006. The entirety of the aforementioned application is herein incorporated by reference.

BACKGROUND

I. Field

The following description relates generally to wireless communications, and more particularly to providing a mechanism for having a flexible pilot pattern in an orthogonal frequency-division multiplexing (OFDM) system.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ) Examples of such multiple-access systems may include code division multiple access (CDMA) systems, time division multiple access (TDMA) systems, frequency division multiple access (FDMA) systems, 3GPP LTE systems, orthogonal frequency division multiplexing (OFDM), localized frequency division multiplexing (LFDM), orthogonal frequency division multiple access (OFDMA) systems, and the like.

In a wireless communication system, a Node B (or base station) may transmit data to user equipment (UE) on a downlink and/or receive data from the UE on an uplink. The downlink (or forward link) refers to a communication link from Node B to the UE, and the uplink (or reverse link) refers to a communication link from the UE to Node B. Node B may also send control information (e.g., assignments of system resources) to the UE. Similarly, the UE may send control information to the Node B to support data transmission on the downlink, or for other purposes.

In state of the art systems a multicast/broadcast transmission mode is used where Node B may transmit to multiple UEs operating within the system. It would be feasible to operate multicast/broadcast (point to multipoint) transmissions as a single frequency network (SFN) and take advantage of higher enhanced data rate provided by the SFN transmission. The SFN allows one or more neighboring cells to transmit same content on a same sub-channel during downlink. However, SFN transmission may not be efficient if an entire portion of bandwidth is used on the downlink when other non-data information is also required to be transmitted.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance an aspect, a method for a wireless communication system, determining a location in time of a sub-frame when SFN transmission for data will occur, determining a first transmission pattern and a second transmission pattern for reference signals, wherein the transmission patterns indicate the symbols and tones of a sub-frame to sue for reference signals, selecting for use, between the first transmission pattern and second transmission pattern for reference signals depending on whether SFN data will be transmitted in the sub-frame, and broadcasting information about the selected transmission pattern prior to use thereof.

In accordance an aspect, a method for a wireless communication system, determining a location in time of a sub-frame when a SFN transmission for data will occur, determining a first transmission pattern for transmitting reference signals, wherein the first transmission pattern comprises location of tones and location of symbols within the sub-frame allocated for transmitting reference signals and broadcasting information about the first transmission pattern prior to use thereof.

In accordance an aspect, a method for a wireless communication system, using a first transmission pattern, wherein the first transmission pattern comprises tones for transmitting a set of data according a single frequency network (SFN) transmission scheme, using a second transmission pattern, wherein the second transmission pattern comprises tones for transmitting reference signals, and broadcasting information about the first and second transmission pattern prior to use thereof.

In accordance an aspect, a method for a wireless communication system, receiving location in time of a sub-frame when a SFN transmission for data will occur, and receiving information about a first transmission pattern, wherein the information comprises location information in time and frequency of at least one resource block used for transmitting a set of data according a single frequency network (SFN) transmission scheme.

In accordance an aspect, a method for a wireless communication system, receiving location in time of a sub-frame when a SFN transmission for data will occur, and receiving information about a first transmission pattern, wherein the information comprises location information in time and frequency of at least one resource block used for transmitting reference signal.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
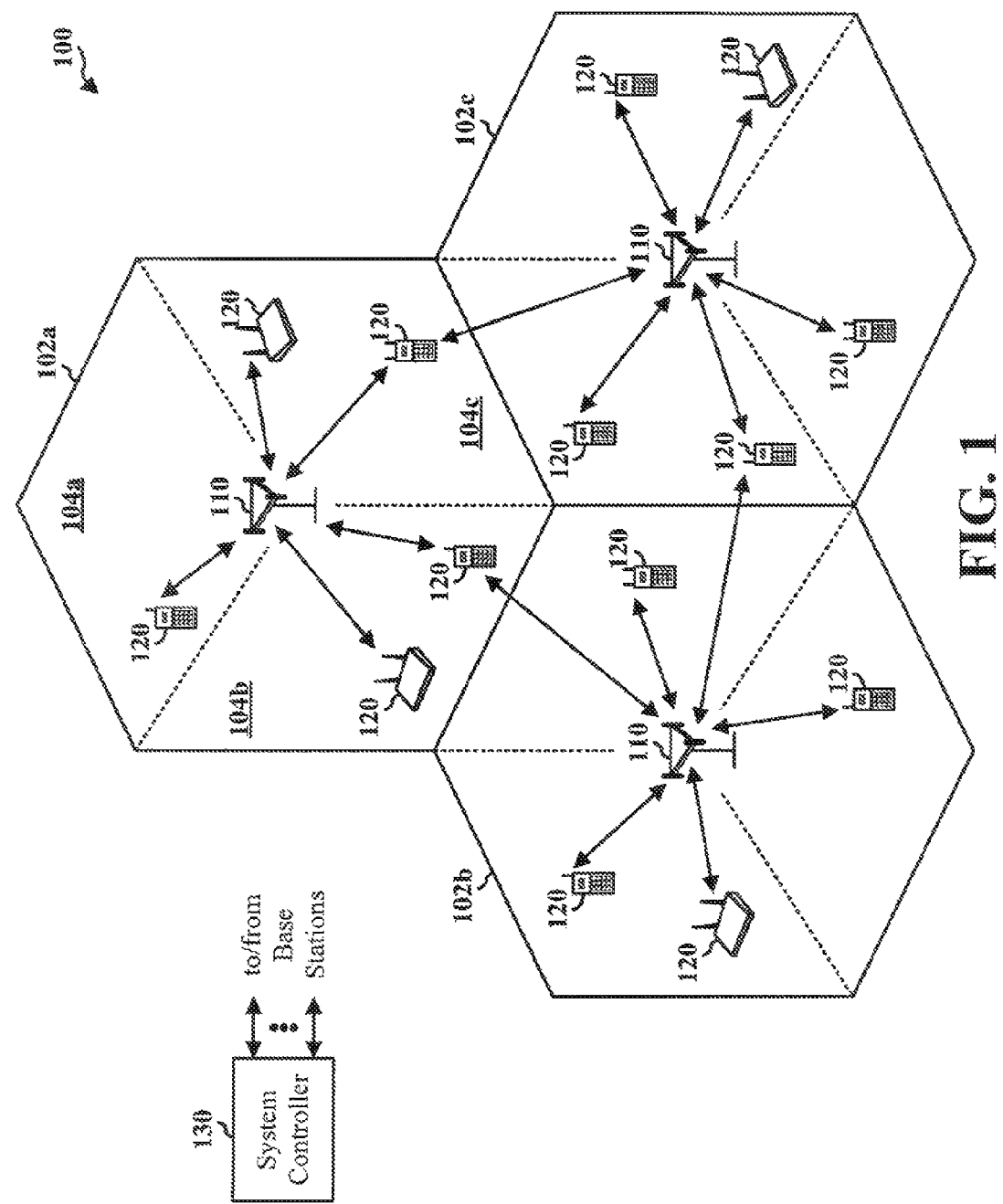
FIG. 1 illustrates a wireless communication system, in accordance with various aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

In addition, various aspects of the disclosure are described below. It should be apparent that the teaching herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein. As an example, many of the methods, devices, systems and apparatuses described herein are described in the context of an ad-hoc or unplanned/semi-planned deployed wireless communication environment that provides synchronized transmission and retransmission of SFN data. One skilled in the art should appreciate that similar techniques could apply to other communication environments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a subscriber station. A subscriber station can also be called a system, a subscriber unit, mobile station, mobile, remote station, remote terminal, access terminal, user terminal, user agent, a suer device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Moreover, the work "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The techniques described herein may be sued for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP), cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

FIG. 1 illustrates a wireless communication system 100 with multiple base stations 110 and multiple terminals 120, such as may be utilized in conjunction with one or more aspects. A base station is generally a fixed station that communicates with the terminals and may also be called an access point, a Node B, or some other terminology. Each base station 110 provides communication coverage for a particular geographic area, illustrated as three geographic areas, labeled 102a, 102b, and 102c. The term "cell" can refer to a base station and/or its coverage area depending on the context in which the term is used. To improve system capacity, a base station coverage area may be partitioned into multiple smaller areas (e.g., three smaller areas, according to cell 102a in FIG. 1), 104a, 104b, and 104c. Each smaller area can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. For simplicity, in the following description, the term "base station" is used generically for a fixed station that serves a sector as well as a fixed station that serves a cell.

Terminals 120 are typically dispersed throughout the system, and each terminal may be fixed or mobile. A terminal may also be called a mobile station, user equipment, a user device, or some other terminology. A terminal may be a wireless device, a cellular phone, a personal digital assistant (PDA), a wireless modem card, and so on. Each terminal 120 may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 130 couples to base stations 110 and provides coordination and control for base stations 110. For a distributed architecture, base stations 110 may communicate with one another as needed. Data transmission on the forward link occurs from one access point to one access terminal at or near the maximum data rate that can be supported by the forward link and/or the communication system. Additional channels of the forward link (e.g., control channel) may be transmitted from multiple access points to one access terminal. Reverse link data communication may occur from one access terminal to one or more access points.

Figure 2:
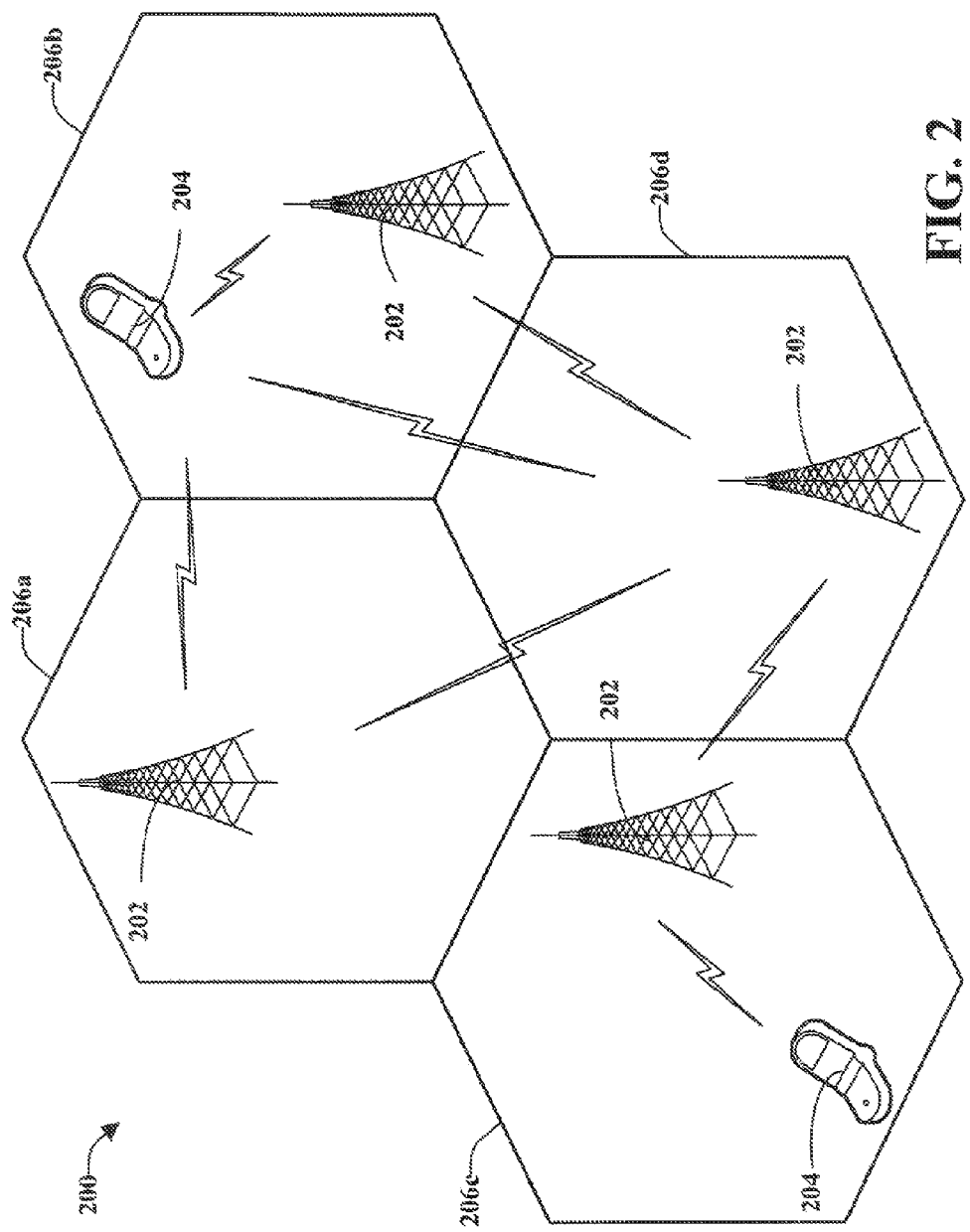
FIG. 2 depicts an example communications apparatus for employment with a wireless communications environment.

FIG. 2 is an illustration of an ad hoc or unplanned/semi-planned wireless communication environment 200, in accordance with various aspects. System 200 can include one or more base stations 202 in one or more sectors that receive, transmit, repeat, etc., wireless communication signals to each other and/or to one or more mobile devices 204. As illustrated, each base station 202 can provide communication coverage for a particular geographic area, illustrated as three geographic areas, labeled 206a, 206b, 206c, and 206d. Each base station 202 can include a transmitter chain and a receiver chain, each of which can in turn comprise a plurality of components associated with signal transmission and reception (e.g., processors, modulators, multiplexers, demodulators, demultiplexers, antennas, and so forth.), as will be appreciated by one skilled in the art. Mobile devices 204 can be, for example, cellular phones, smart phones, laptops, handheld communication devices, handheld computing devices, satellite radios, global positioning systems, PDAs, and/or any other suitable device for communicating over wireless network 200. System 200 can be employed in conjunction with various aspects described herein in order to a flexible pilot pattern.

The transmission techniques described herein can be used for various wireless communication systems such as CDMA, TDMA, FDMA, OFDMA, and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (W-CDMA) and Low Chip Rate (LCR). cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), IEEE 802.11, IEEE 802.16, IEEE 802.20, Flash-OFDM®, etc. These various radio technologies and standards are known in the art. UTRA, E-UTRA, and GSM are part of Universal Mobile Telecommunication System (UMTS).

Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). For clarity, certain aspects of the techniques are described below for uplink transmission in LTE, and 3GPP terminology is used in much of the description below.

LTE utilizes orthogonal frequency division multiplexing (OFDM) on the downlink and single-carrier frequency division multiplexing (SC-FDM) on the uplink. OFDM and SC-FDM partition the system bandwidth into multiple (N) orthogonal subcarriers, which are also commonly referred to as tones, bins, etc. Each subcarrier may be modulated with data. In general, modulation symbols are sent in the frequency domain with OFDM and in the time domain with SC-FDM. For LTE, the spacing between adjacent subcarriers may be fixed, and the total number of subcarriers (N) may be dependent on the system bandwidth. In one design, N=512 for a system bandwidth of 5 MHz, N=1024 for a system bandwidth of 10 MHz, and N=2048 for a system bandwidth of 20 MHz. In general, N may be any integer value.

The LTE downlink transmission scheme is partitioned by radio frames (e.g. 10 ms radio frame). Each frame comprises a pattern made of frequency (e.g. sub-carrier) and time (e.g. OFDM symbols). The 10 ms radio frame is divided into plurality of adjacent 0.5 ms sub-frames (also referred to as sub-frames or timeslots and interchangeably used hereinafter). Each sub-frame comprises plurality of resource blocks, wherein each resource block made up of one or more sub-carrier and one or more OFDM symbol. One or more resource blocks may be sued for transmission of data, control information, pilot (also referred to as reference signal), or any combination thereof.

In order to achieve most effective use of SFN and cell specific (e.g., unicast or multicast) schemes, different approaches for multiplexing SFN and cell specific pilots in the downlink are described herein. A cell specific pilot is transmitted in FDM and is scrambled with a cell specific scrambled code. Use of FDM operation allows for frequency reuse larger than 1, wherein the pilot tones from few neighboring cells do not collide with each other. This results in an improved channel estimate, especially at cell edge.

Figure 3:
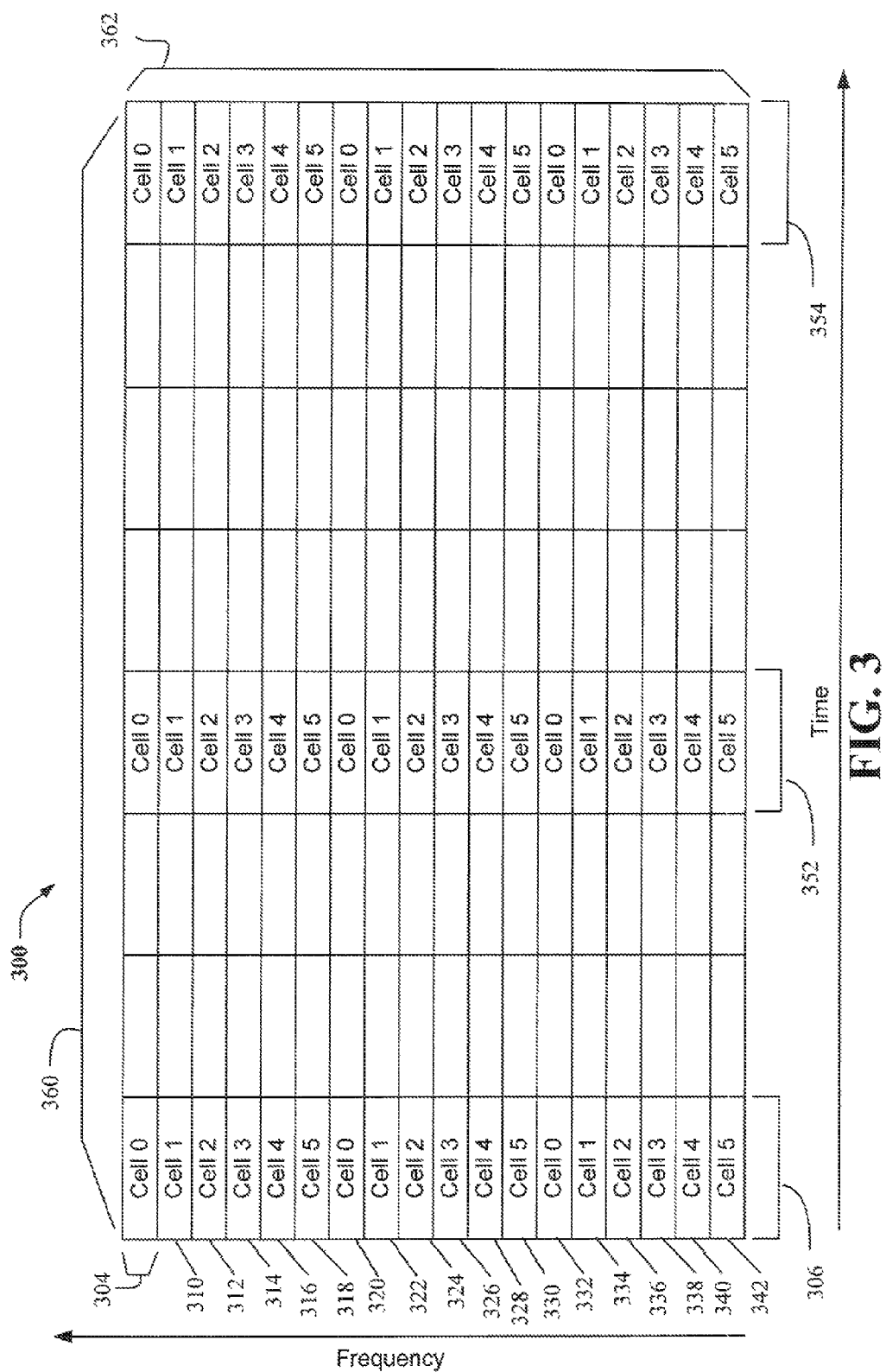
FIG. 3 illustrates a cell specific pilot transmission pattern.

FIG. 3 illustrates a cell specific pilot transmission pattern 300 for sub-frame of a downlink transmission according to an example. According to an example, the cell specific pilot pattern is for a sub-frame of a radio frame made of time period 360 by frequency bandwidth of 362. In the exemplary pilot pattern, all tones for a symbol 306 are allocated for transmitting pilot information. According to this example, a maximum of six cells would not collide as their pilot transmission is accomplished using different tones during a symbol period. For example, cell 0 pilot information is transmitted using tones 304, 320, and 332; cell 1, pilot information is transmitted using tones 310, 322, and 334; cell 2, pilot information is transmitted using tones 312, 324, and 336; cell 3, pilot information is transmitted using tones 314, 326, and 338; cell 4, pilot information is transmitted using tones 316, 328, and 340; and cell 5, pilot information is transmitted using tones 318, 330, and 342. This pattern may be repeated several symbol periods, for example symbol period 352 and 354. For the remaining tones in a sub-frame, the transmitter may transmit non-pilot information. According to an aspect, the cell 0 may transmit data or other information (e.g. non pilot information) on tones where cells 1, 2, 3, 4, and 5 transmit pilots. Thus, the pilot tones experience a lower interference power spectral density (PSD) and higher signal to noise ratio (SNR), which leads to an improved channel estimate. Depending on the system deployment, fewer or more cell may be designated to not collide.

Figure 4:
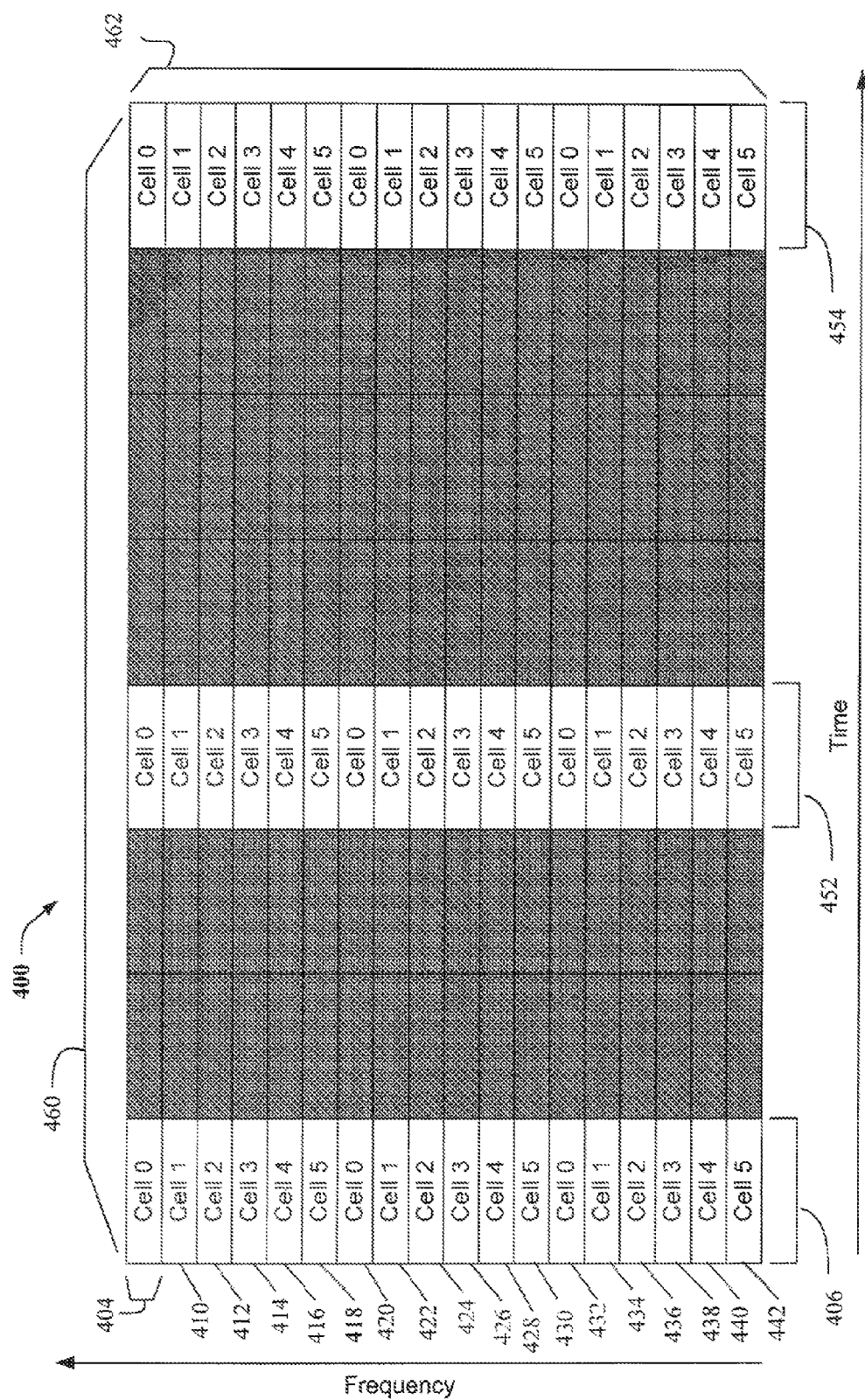
FIG. 4 illustrates a transmission pattern having SFN transmission.

FIG. 4 illustrates transmission pattern having SFN transmission 400 used for a sub-frame of downlink transmission according to an aspect wherein the cell specific pilots are multiplexed with SFN data (e.g. data transmitted using SFN transmission scheme) on the same sub-frame. According to an example, the transmission pattern is for a sub-frame of a radio frame made of time period 460 by frequency bandwidth of 462. In the exemplary pattern, all tones for a symbol 406 are allocated for transmitting pilot information. In this example, six cells are shown which do not collided with each other. This is achieved by allocating a tone for each cell to transmit pilot information. For example, cell 0 pilot information is transmitted using tones 404, 420, and 432; cell 1, pilot information is transmitted using tones 410, 422, and 434; cell 2, pilot information is transmitted using tones 412, 424, and 436; cell 3, pilot information is transmitted using tones 414, 426, and 438; cell 4, pilot information is transmitted using tones 416, 428, and 440; and cell 5, pilot information is transmitted using tones 418, 430, and 442. This pattern may be repeated several symbol periods, for example symbol period 452 and 454. The remaining tones are designated for SFN transmission (shown in FIG. 4 as shaded). In an aspect, when SFN and cell specific transmissions are multiplexed in the same sub-frame, the frequency reuse may not be larger than 1 for cell specific sub-frame where cells are not allowed to collide with each other. This is due to the nature of SFN transmission. Thus, in this example, cell 0 can not transmit SFN transmission where cells 1, 2, 3, 4 and 5 transmit the pilot information. Thus, if pilots from different cells are not allowed to collide with each other, then for a given cell, non-pilot tones can not be used for SFN data. However, cell 0 may transmit other information such as control information, assignments, null tones (such that frequency reuse pattern on the null tones is identical to the frequency reuse pattern on the data tones), or any non-pilot and non-SFN data. Thus, the transmission pattern for a cell 0 may comprise transmission of a pilot tone repeated based on number of cells designated to avoid collision, for example, tones 404, 420 and 432. The transmission pattern may further comprise transmission of non-pilot and non-SFN transmission on tones used by other cells for the pilot transmission. For example, tones 410, 412, 414, 416, 418, 422, 424, 426, 428, 430, 434, 436, 438, 440 and 442. The remaining tones in the exemplary sub-frame would be used for SFN transmission.

Figure 5:
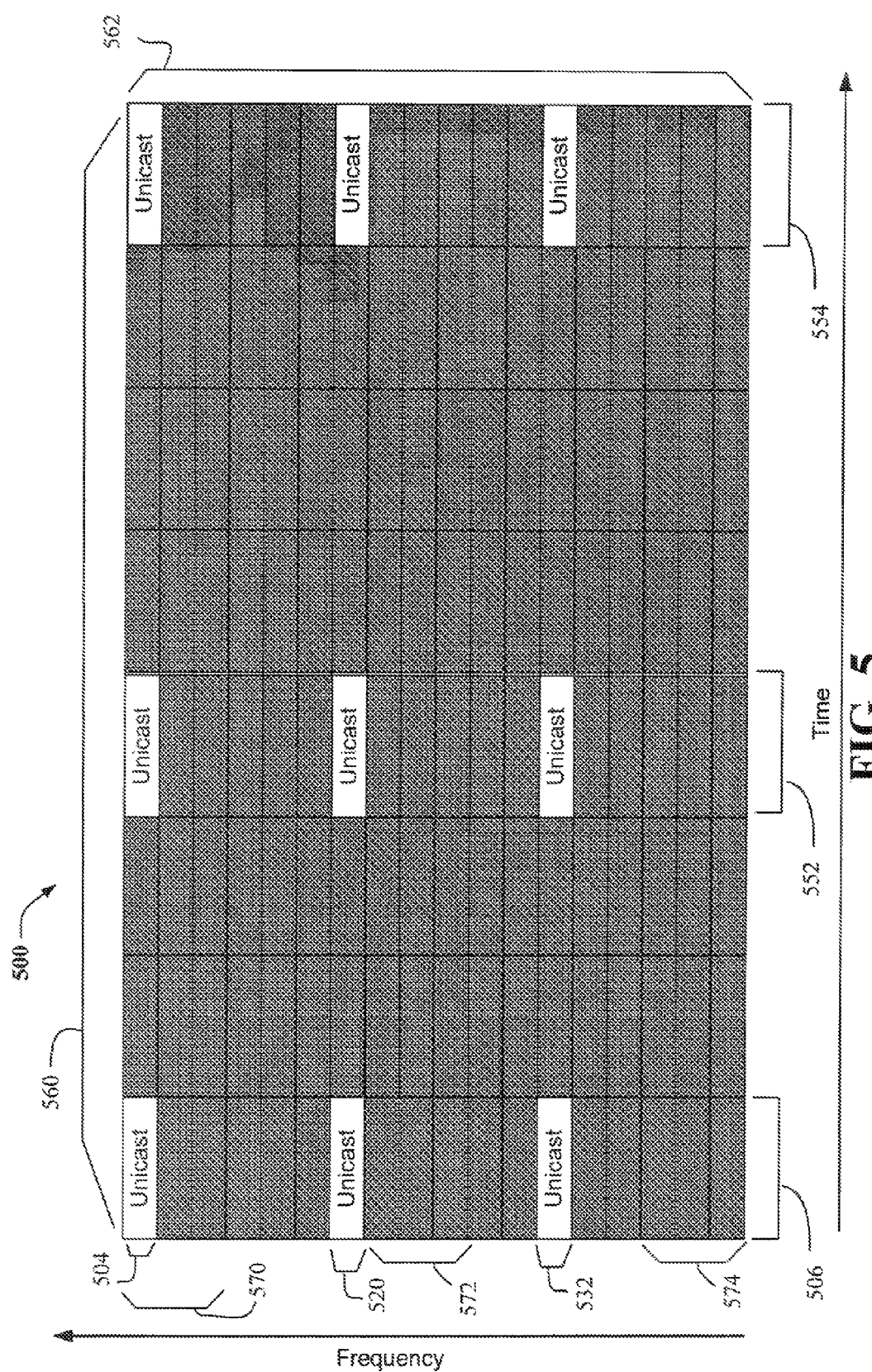
FIG. 5 illustrates a transmission pattern having SFN transmission on every symbol of a sub-frame.

FIG. 5 shows a downlink (DL) transmission (TX) pattern 500 (also referred to as SFN+CD transmission pattern) according to another aspect wherein the cell specific pilots are multiplexed with SFN data (e.g. data transmitted using SFN transmission scheme) on the same sub-frame. According to an example, the transmission pattern is for a sub-frame of a radio frame made of time period 560 by frequency bandwidth of 562. According to an aspect, all cells in the system are required to use designated tones for pilot transmission (shown as unicast.), for null tones or any combination thereof. According to the exemplary transmission pattern, resource blocks defined at sub-carrier 504, 520, and 532 and for symbol 506, 552 and 554 are used for pilot information transmission by all the cells in the system. According to another aspect, a transmission pattern (not shown) may be sued to allocate pilot tones which do not collide with pilot tone used by other cells. The remaining tones are allocated for SFN transmission scheme for delivering content to the UE. Thus, the pilots of each cell are allowed to collide and allowing SFN transmission on a larger set of tones.

For a flexible pilot pattern scheme, the tones designated for pilot transmission, may be adjacent in frequency, in time or any combination thereof. Thus, in an aspect, a SFN+CS transmission pattern having all pilot tones adjacent in frequency. In another aspect, a SFN+CS transmission pattern having all pilot tones adjacent in time. In another aspect, a SFN+CS transmission pattern having all tones designated for cell specific pilot transmission adjacent in frequency and clustered in top of frequency bandwidth of a sub-frame. For example all the pilot transmission tones are adjacent at 570 for symbols 506, 552 and 554. In another aspect, a SFN+CS transmission pattern having all tones designated for cell specific pilot transmission adjacent in frequency and clustered in middle of frequency bandwidth of a sub-frame. For example all the pilot transmission tones are adjacent at 572 for symbols 506, 552 and 554. In another aspect, a SFN+CS transmission pattern having all tones designated for cell specific pilot transmission adjacent in frequency and clustered in bottom of frequency bandwidth of a sub-frame. For example all the pilot transmission tones are adjacent at 574 for symbols 506, 552 and 554. It should be noted that depending on the system, not all cells may repeat transmission of pilots in frequency and in time. Thus, for example, a cell may only transmit pilots on tones designated by sub-carrier 504 for symbols 506, 552 and 554 or on sub-carrier 504, 520 and 532 for symbol period 552.

Figure 6:
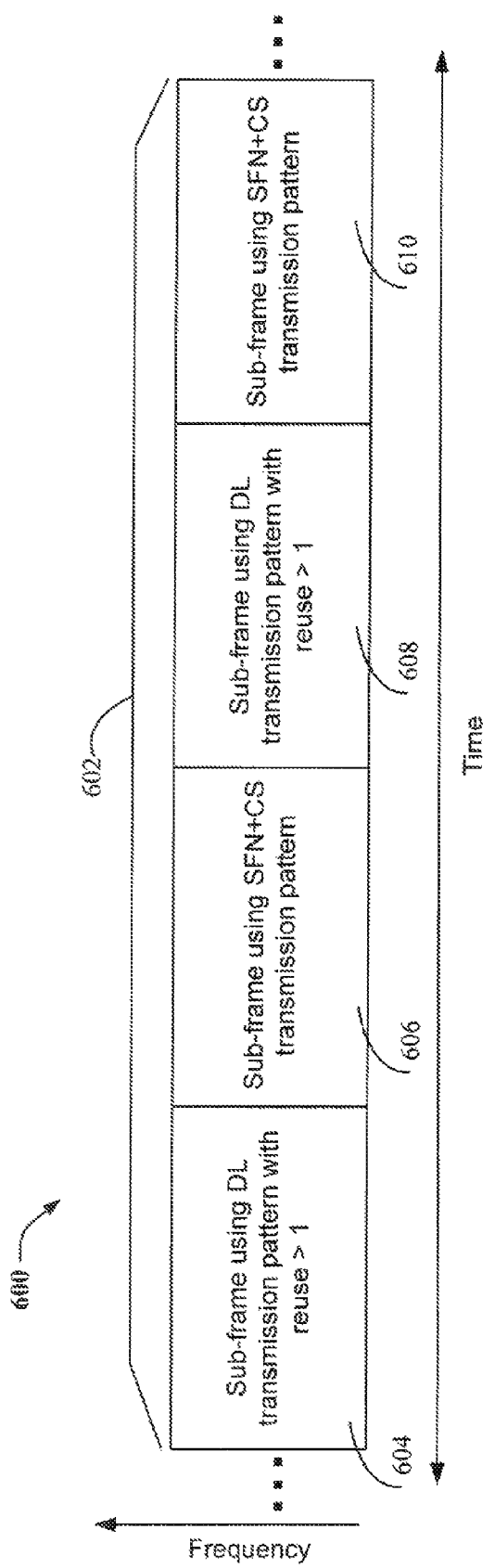
FIG. 6 illustrates a frame structure that uses various downlink transmissions.

FIG. 6 shows a frame structure 600 that uses the downlink transmission patterns described above during the operation of the system. According to an aspect, the cell specific pilots are transmitted using one or more patterns selected from a set of DL transmission patterns. For example, during a time period 602, four sub-frames are transmitted 604, 606, 608 and 610. In an aspect, for sub-frame 604, system may select a first pattern (e.g. cell specific−reuse>1 as described in FIG. 3) or a second pattern (e.g. cell specific+SFN as described in FIG. 5 and all the variation of that pattern). For 606, 608 and 610 sub-frames, the system may use first pattern or second pattern. Thus, in sub-frames wherein there are no SFN a transmission, the cell specific pilot pattern corresponds to a frequency reuse is greater than 1. In other sub-frames, the pattern corresponds to a frequency reuse of 1.

Each cell comprises a mechanism for selecting the downlink transmission pattern based on over all condition of the system, the requirement of data rate, the rate at which certain content must be delivered, etc. The use of SFN+CS transmission pattern may be periodic. In such case, the allocation of a sub-frame selected to use SFN+CS transmission pattern is periodically broadcasted in every cell. Once the DL transmission pattern is selected, all the cells in system will broadcast (e.g. signaling using a broadcast channel) the information about selected DL transmission pattern. This may achieved by transmitting to UE an indicator (one or more bits) and the sub-frame when DL transmission pattern will be used by the cell. The DL transmission pattern may be effective only for a sub-frame, wherein the indication must be re-signaled or broadcasted prior to use of the selected DL TX pattern. Alternatively, one or more sub-frames may be allocated for using a selected DL TX pattern. In such situations, information about the allocated sub-frames that will he used, for example the SFN+CS transmission pattern, will be broadcasted by the cells to the UE.

In an aspect, the DL TX patterns described above may be identified using identifiers. In order to reduce overhead, only the TX pattern identifier and designated sub-frame number are broadcasted to the UE. The UE then can extract the exact processing methods associated with TX pattern from memory and apply the method to process received transmission for the designated sub-frame.

Figure 7:
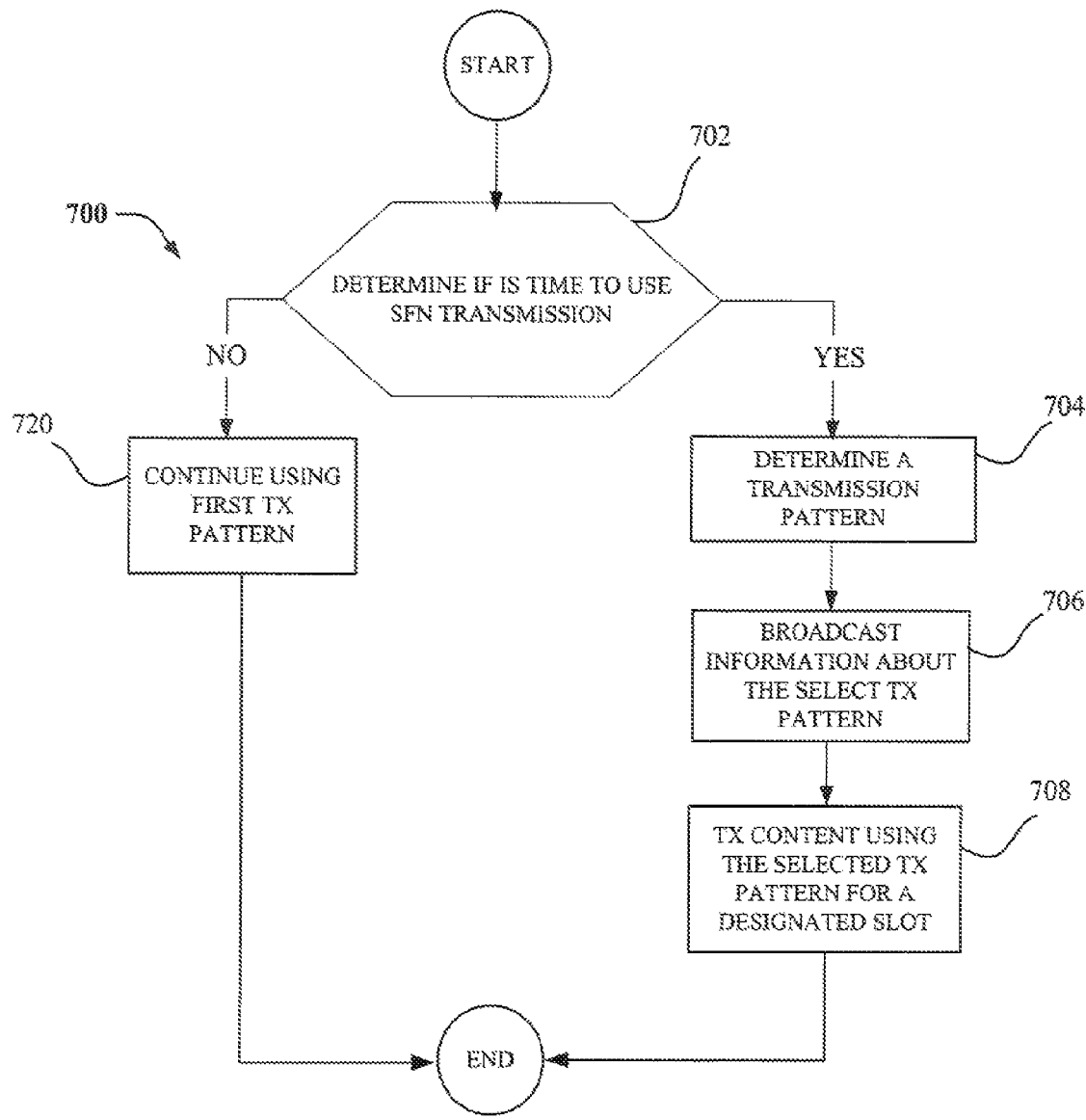
FIG. 7 illustrates a sample methodology for facilitating a broadcasting of an indication of a selected DL TX pattern.
Figure 8:
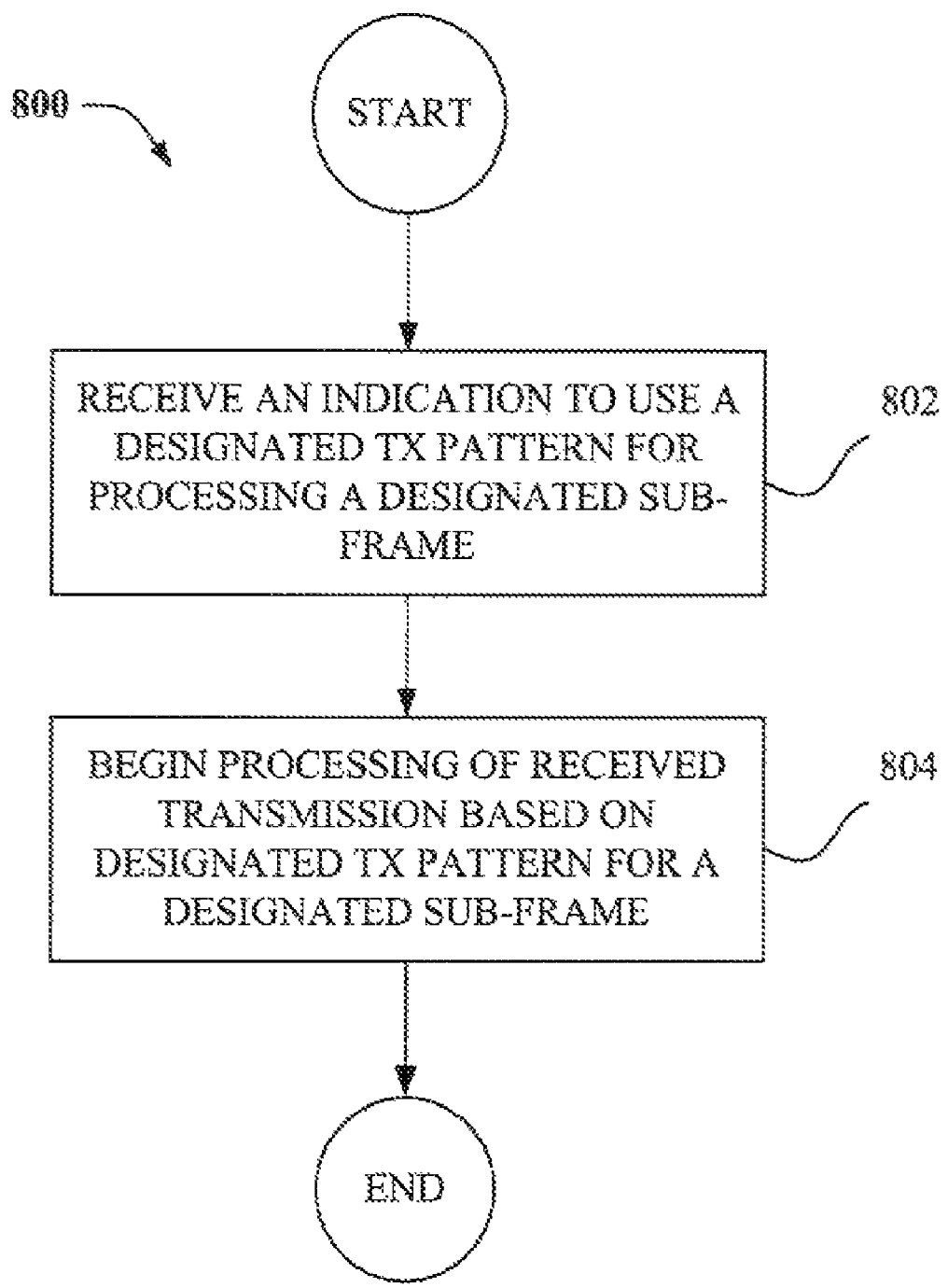
FIG. 8 illustrates a sample methodology for facilitating receiving an indication of a selected DL TX pattern.

Referring to FIGS. 7-8, methodologies relating a mechanism for using and broadcasting an indication of the SFN+CS transmission pattern allocated as DL transmission of a sub-frame. While, for purposes of simplicity of explanation, the methodologies are shown and described as a series of acts, it is to be understood and appreciated that the methodologies are not limited by the order of acts, as some acts may, in accordance with the claimed subject matter, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter.

Turning specifically to FIG. 7, an example methodology 700 that facilitates a broadcasting of an indication of selected DL TX pattern in wireless communication system according to an aspect is illustrated. Method 700 can facilitate transmitting indication from a cell (e.g., an enhanced Node base station, eNode B, access point (AP), base station or like mechanism) to one or more terminal devices (e.g. user equipment, UE, AT, or like mechanism) of a wireless communication network. The method starts at 702, the method determines if it is time to use a SFN transmission for downlink transmission. In an aspect, the cell periodically determines if the SFN transmission is required to transmit content at enhanced data rate or receives a request from the system to start using SFN transmission. In an aspect, the cell receives an indication from the system to perform a SFN transmission and location in time of sub-frame when SFN transmission for data should occur. If determined that SFN transmission is required, the method executes blocks 704, 706 and 708. Otherwise, at block 720, the method continues using a default transmit pattern, for example the first pattern described in FIG. 3. At block 704, the cell determines a SFN transmission pattern from one or more transmission patterns, each indicating the symbols and tone of sub-frame to use for reference signals (e.g. pilot data) and for transmitting data using SFN transmission scheme. Once the transmission is selected the cell allocates the selected pattern for a designated sub-frame. Depending on the system, the method selects one SFN of the transmission patterns from a list of several types of SFN transmission patterns available. For example, the SFN+CS transmission pattern described above in FIG. 5 or variations of that pattern (e.g. patterns having clustered or staggered pilot tones based on frequency and/or time). After selecting a transmission pattern, the method moves to block 706. At 706, the cell broadcasts the selected DL transmission pattern information and the designated sub-frame to all the UEs that the cell serves. Depending on requirement of the system, the method may broadcast the indication a priori and allow all the UEs to receive the indication before using the selected DL transmission pattern. The indication may be a predetermined TX pattern identifier or more detailed information about the selected transmission pattern. At block 708, the method transmits data (e.g. content) using the selected DL transmission pattern for the designated sub-frame.

Turning to FIG. 8, an example methodology 800 that facilitates a receiving an indication of a selected DL TX pattern in wireless communication system according to an aspect is illustrated. Method 800 can facilitate receiving an indication from a cell (e.g., an enhanced Node base station, eNode B, access point (AP), base station or like mechanism) a wireless communication network. According to an aspect, at block 802, the method receives on the forward link, an indication to use a designated SFN TX pattern (e.g. SFN+CS transmission pattern) for processing a designated sub-frame. At block 804, the method begins processing of received transmissions based on designated SFN TX pattern for a designated sub-frame.

Figure 9:
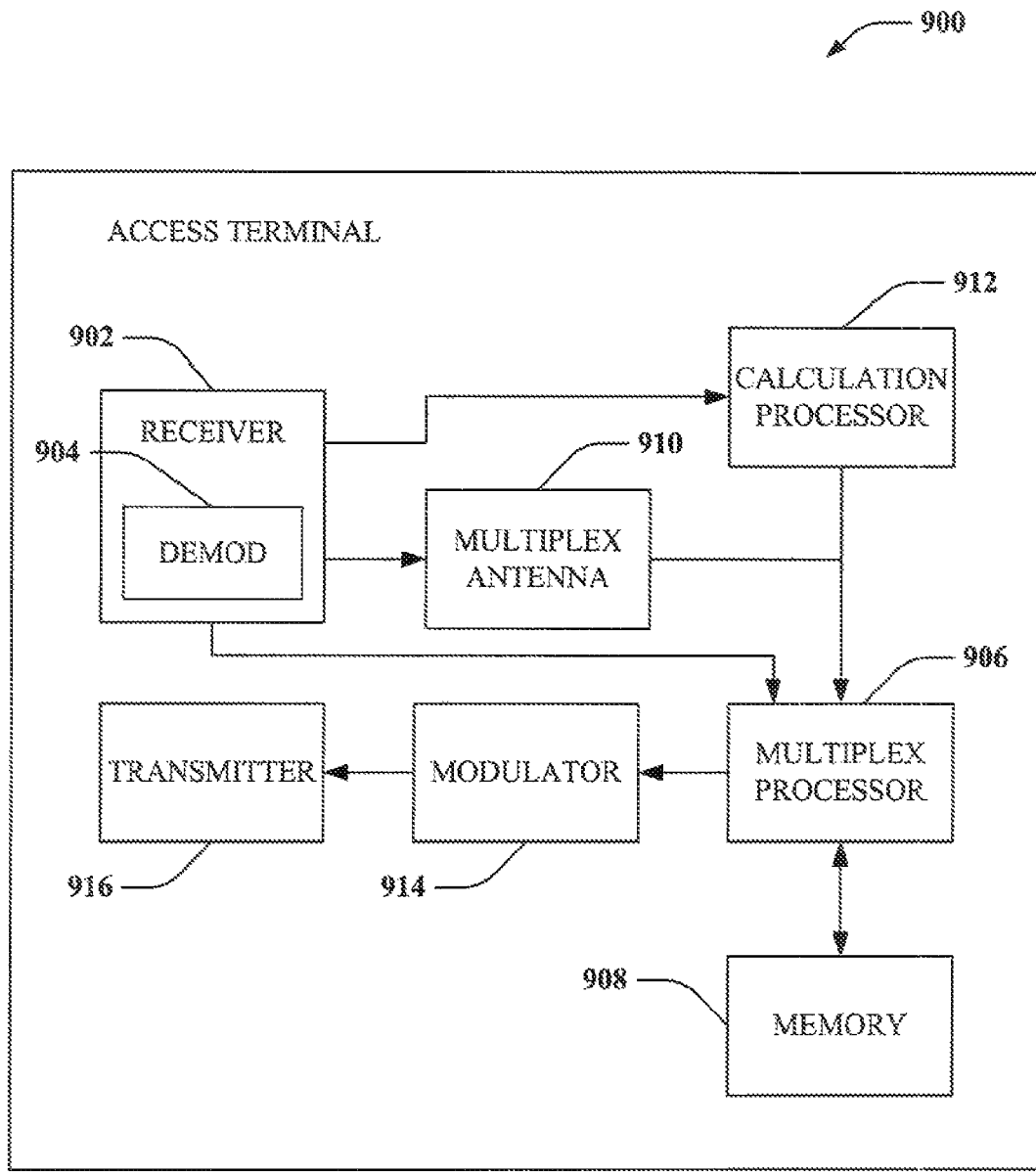
FIG. 9 depicts an exemplary access terminal that can provide feedback to communications networks.

FIG. 9 depicts an exemplary access terminal 900 that can provide feedback to communications networks, in accordance with one or more aspects. Access terminal 900 comprises a receiver 902 (e.g., an antenna) that receives a signal and performs typical actions on (e.g., filters, amplifiers, downconverts, etc.) the received signal. Specifically, receiver 902 can also receive a service schedule defining services apportioned to one or more blocks of a transmission allocation period, a schedule correlating a block of downlink resources with a block of uplink resources for providing feedback information as described herein, or the like. Receiver 902 can include a demodulator 904 that can demodulate received symbols and provide them to a processor 906 for evaluation. Processor 906 can be a processor dedicated to analyzing information received by receiver 902 and/or generating information for transmission by a transmitter 916. Additionally, processor 906 can be a processor that controls one or more components of access terminal 900, and/or a processor that analyzes information received by receiver 902, generates information for transmission by transmitter 916, and controls one or more components of access terminal 900. Additionally, processor 906 can execute instructions for interpreting a correlation of uplink and downlink resources received by receiver 902, identifying un-received downlink block, or generating a feedback message, such as a bitmap, appropriate to signal such un-received block or blocks, or for analyzing a hash function to determine an appropriate uplink resource of a plurality of uplink resources, as described herein.

Access terminal 900 can additionally comprise memory 908 that is operatively coupled to processor 906 and that may store data to be transmitted, received, and the like. Memory 908 may store information related to downlink resource scheduling, protocols for evaluating the foregoing, protocols for identifying un-received portions of a transmission, for determining an indecipherable transmission, for transmitting a feedback message to an access point, and the like.

It will be appreciated that the data store (e.g., memory 908) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and methods is intended to comprise, without being limited to, these and any other suitable types of memory.

Receiver 902 is further operatively coupled to multiplex antenna 910 that can receive a scheduled correlation between one or more additional blocks of downlink transmission resources and a block of uplink transmission resources (e.g., to facilitate providing multiple NACK or ACK messages in a bitmap response). A multiplex processor 906 can include a multi-digit bitmap within a feedback message that provides an ACK or NACK message indicating whether a first downlink block and each of one or more additional downlink blocks are received or un-received, over a single uplink resource. Further, a calculation processor 912 can receive a feedback probability function, wherein the function limits a probability that a feedback message is provided by access terminal 900, as described herein, if the block of downlink transmission resources, or data associated therewith, is not received. Specifically, such probability function can be employed to reduce interference if multiple devices are reporting lost data simultaneously.

Access terminal 900 still further comprises a modulator 914 and a transmitter 916 that transmits the signal to, for instance, a base station, an access point, another access terminal, a remote agent, etc. Although depicted as being separate from the processor 906, it is to be appreciated that signal generator 910 and indicator evaluator 912 may be part of processor 906 or a number of processors (not shown).

Figure 10:
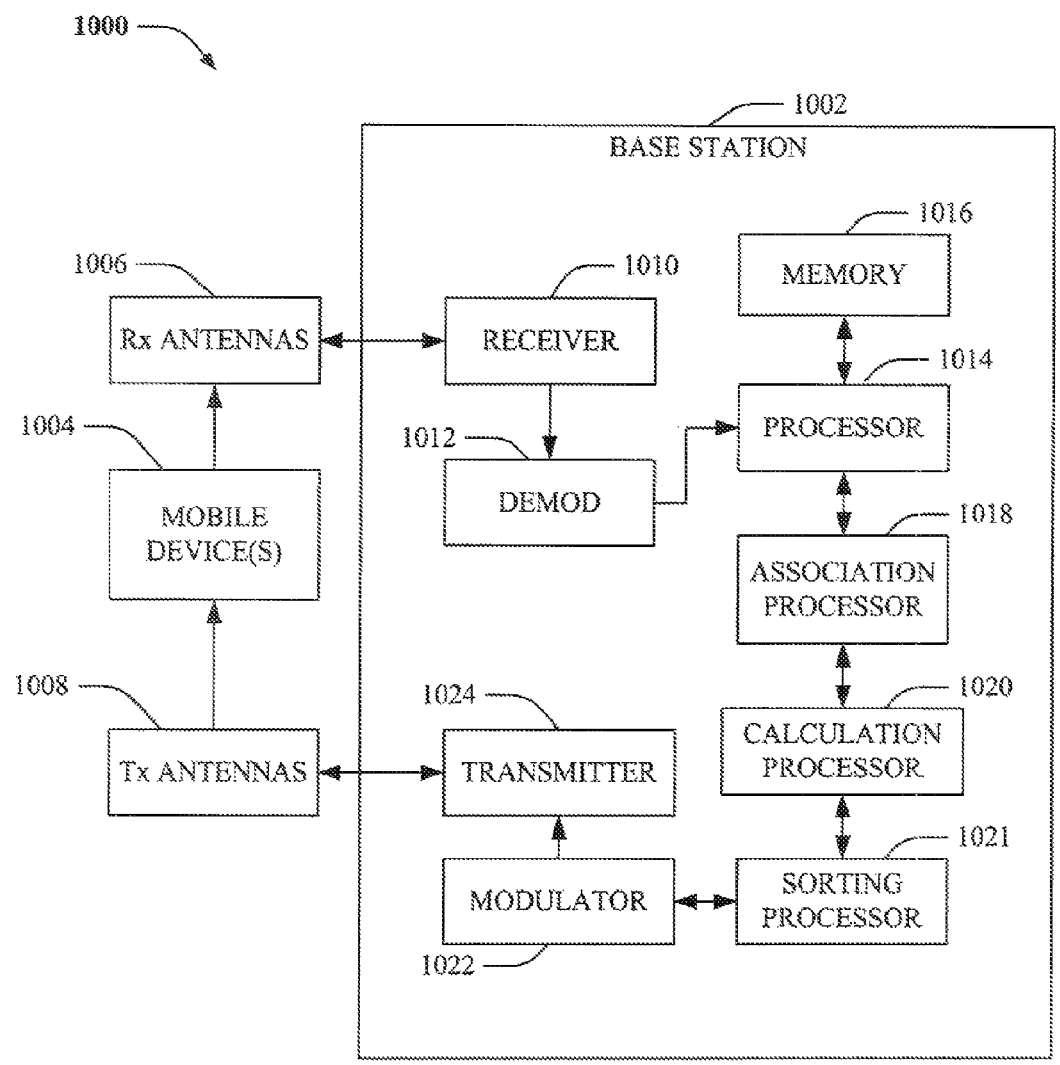
FIG. 10 illustrates an exemplary base station that can be employed in conjunction with a wireless networking environment disclosed herein.

FIG. 10 is an illustration of a system 1000 that facilitates provision of feedback related to lost transmission data for an LTE network. System 1000 comprises a base station 1002 (e.g., access point, . . . ) with a receiver 1010 that receives signal(s) from one or more mobile devices 1004 through a plurality of receive antennas 1006, and a transmitter 1022 that transmits to the one or more mobile devices 1004 through a transmit antenna 1008. Receiver 1010 can receive information from receive antennas 1006 and can further comprise a signal recipient (not shown) that receives feedback data related to an un-received or indecipherable data packet. Additionally, receiver 1010 is operatively associated with a demodulator 1012 that demodulates received information. Demodulated symbols are analyzed by a processor 1014 that is coupled to a memory 1016 that stores information related to correlating uplink and downlink resources, Providing dynamic and/or static correlations from a network, as well as data to be transmitted to or received from mobile device(s) 1004 (or a disparate base station (not shown)), and/or any other suitable information related to performing the various actions and functions set forth herein.

Processor 1014 is further coupled to an association processor 1018 that can schedule a correlation during an allocation period between a block of downlink transmission resources and a block of uplink transmission resources for a multicast or broadcast service. Additionally, association processor 1018 can further schedule a correlation between one or more additional blocks of uplink transmission resources and the block of downlink transmission resources, to enable receipt of a plurality of feedback messages for the downlink resource. As a result, a relative number of feedback messages related to the downlink resource can be determined. Moreover, association processor 1018 can schedule a correlation between a plurality of blocks of downlink transmission resources and an uplink transmission resource for a multicast or broadcast service, such that a single bitmap included within a feedback message can indicate ACK or NACK information for the plurality of blocks of downlink transmission resources.

Association processor 1018 can be coupled to a calculation processor 1020 that generates a probability factor, which can limit likelihood that a terminal device will provide the feedback message. The probability factor can be employed by base station 1002 to reduce feedback interference from multiple terminal devices. Additionally, calculation processor 1020 can generate a hash function transmitted by base station 1002 that can indicate to each of a plurality of terminal devices a particular uplink transmission resource to use in submitting a feedback message. The hash function indication can be based at least in part on an access class of each terminal device, a hash of each terminal identity, an identity of a service utilized by each terminal device, or block-specific information, or a combination thereof.

Additionally, calculation processor 1020 can be coupled to a sorting processor 1021 that can determine a number of received feedback messages related to the block of downlink transmission resources. For instance, if a block of downlink transmission resources is coupled with multiple uplink transmission resources (e.g., by association processor 1018, as described above), two or more feedback messages can be received by base station 1002 for the downlink resource. The sorting processor 1021 can therefore identify what feedback messages correspond to the downlink block, which can indicate a retransmission priority for that downlink block. Furthermore, the sorting processor 1021 can elect between retransmitting multiple blocks of downlink transmission resources based at least in part on the number of received feedback messages related to each block of downlink transmission resources.

Figure 11:
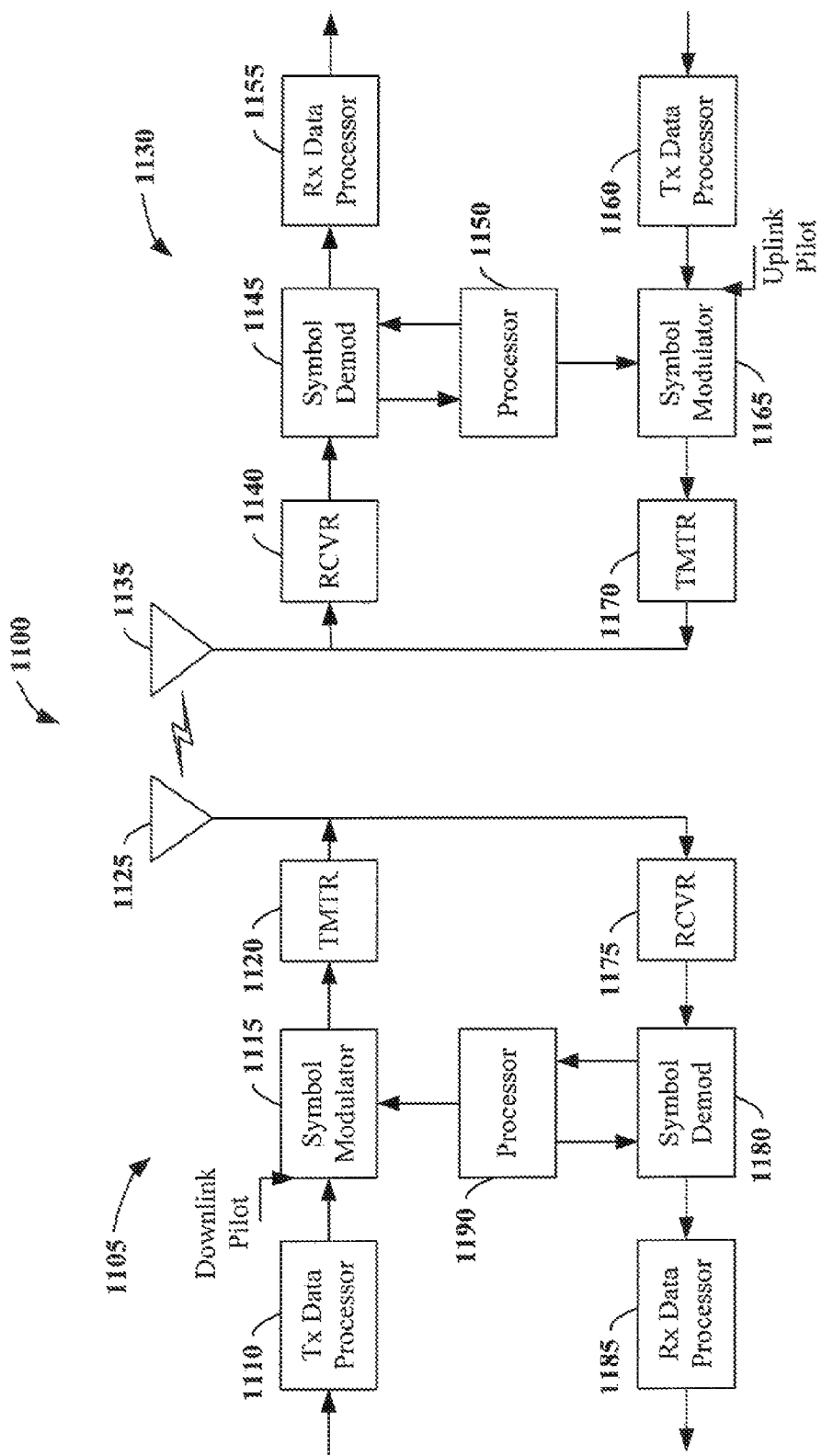
FIG. 11 depicts an exemplary system that facilitates providing feedback to a wireless communication environment in accordance with one or more aspects.

Referring now to FIG. 11, on a downlink, at access point 1105, transmit (TX) data processor 1110 receives, formats, codes, interleaves, and modulates (or symbol maps) traffic data and provides modulation symbols ("data symbols"). A symbol modulator 1115 receives and processes the data symbols and pilot symbols and provides a stream of symbols. A symbol modulator 1115 multiplexes data and pilot symbols and provides them to a transmitter unit (TMTR) 1120. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1120 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1125 to the terminals. At terminal 1130, an antenna 1135 receives the downlink signal and provides a received signal to a receiver unit (RCVR) 1140. Receiver unit 1140 conditions (e.g., filters, amplifies, and frequency downconverts) the received signal and digitizes the conditioned signal to obtain samples. A symbol demodulator 1145 demodulates and provides received pilot symbols to a processor 1150 for channel estimation. Symbol demodulator 1145 further receives a frequency response estimate for the downlink from processor 1150, performs data demodulation on the received data symbols to obtain data symbol estimates (which are estimates of the transmitted data symbols), and provides the data symbol estimates to an TX data processor 1155, which demodulates (e.g., symbol demaps), deinterleaves, and decodes the data symbol estimates to recover the transmitted traffic data. The processing by symbol demodulator 1145 and RX data processor 1155 si complementary to the processing by symbol modulator 1115 and TX data processor 1110, respectively, at access point 1105.

On uplink, a TX data processor 1160 processes traffic data and provides data symbols. A symbol modulator 1165 receives and multiplexes the data symbols with pilot symbols, performs modulation, and provides a stream of symbols. A transmitter unit 1170 then receives and processes the stream of symbols to generate an uplink signal, which is transmitted by the antenna 1135 to the access point 1105.

At access point 1105, the uplink signal from terminal 1130 is received by the antenna 1125 and processed by a receiver unit 1175 to obtain samples. A symbol demodulator 1180 then processes the samples and provides received pilot symbols and data symbol estimates for the uplink. An RX data processor 1185 processes the data symbol estimates to recover the traffic data transmitted by terminal 1130. A processor 1190 performs channel estimation for each active terminal transmitting on the uplink. Multiple terminals may transmit pilot concurrently on the uplink on their respective assigned sets of pilot subbands, where the pilot subband sets may be interlaced.

Processors 1190 and 1150 direct (e.g., control, coordinate, manage, etc.) operation at access point 1105 and terminal 1130, respectively. Respective processors 1190 and 1150 can be associated with memory units (not shown) that store program codes and data. Processors 1190 and 1150 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, which may be digital, analog, or both digital and analog, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1190 and 1150.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 12:
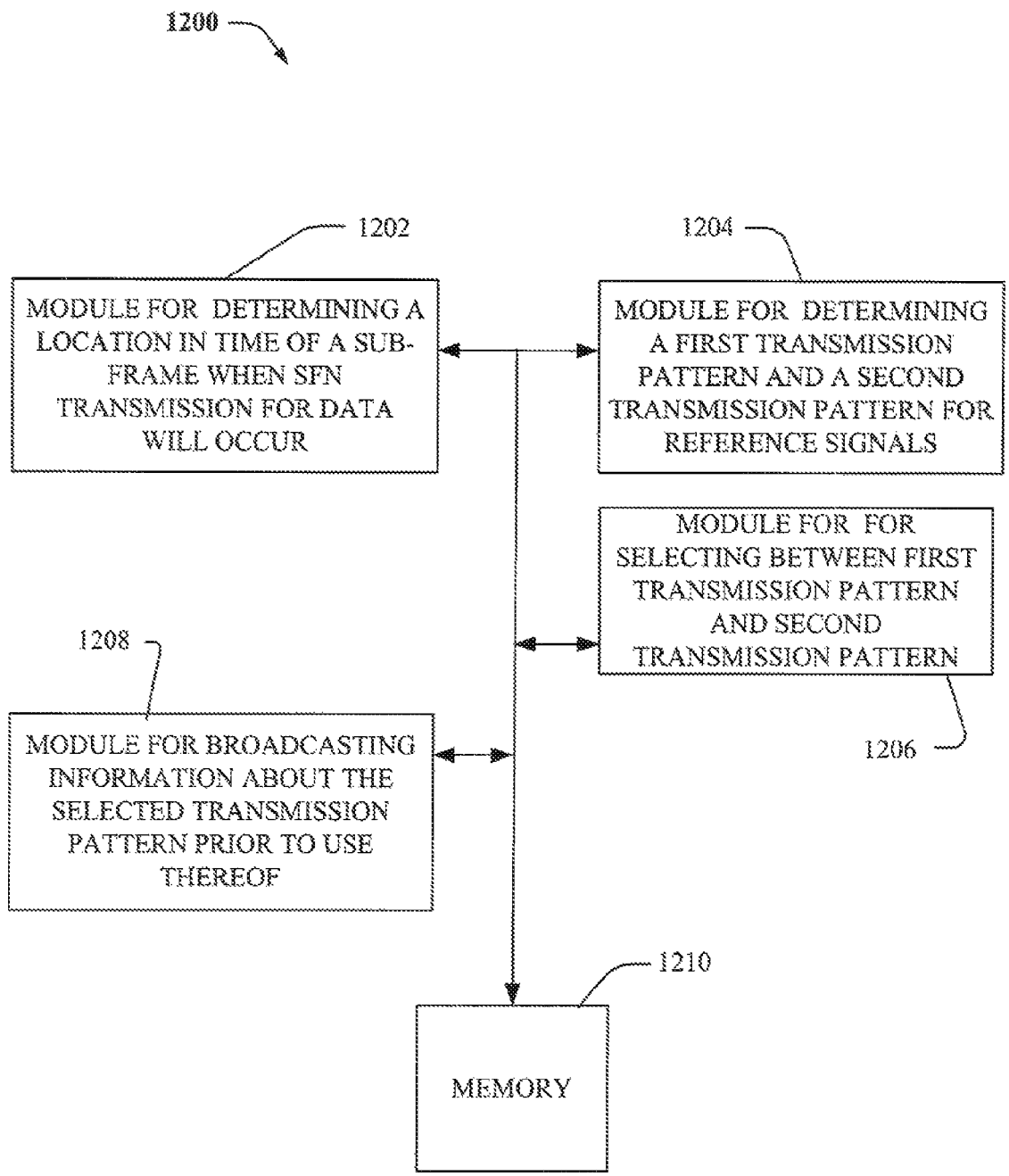
FIG. 12 depicts an exemplary system that facilitates a use of flexible transmit pattern technique in accordance with one or more aspects.

Referring now to FIG. 12, a system 1200 that facilitates a use of flexible transmit pattern in a wireless communication is illustrated. System 1200 may include a module 1202 for determining a location in time of a sub-frame when SFN transmission for data will occur. A module 1204 for determining a first transmission pattern and a second transmission pattern for reference signals 1206 for selecting for use, between the first transmission pattern and second transmission pattern for reference signals depending on whether SFN data will be transmitted in the sub-frame and a module 1208 for broadcasting information about the selected transmission pattern prior to use thereof. Modules 1202-1208 may be a processor or any electronic device and may be coupled to memory module 1210.

Figure 13:
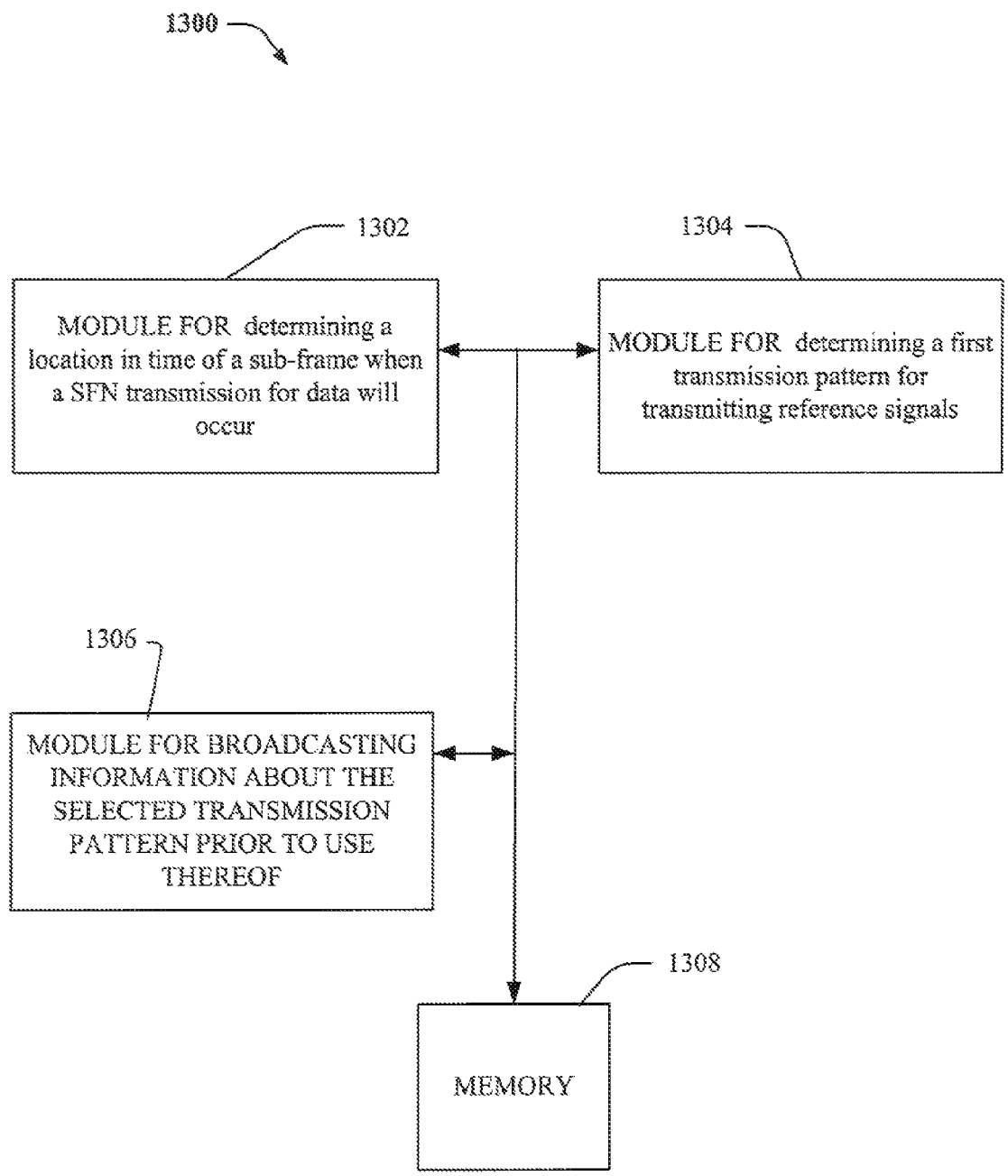
FIG. 13 depicts an exemplary system that facilitates a use of flexible transmit pattern technique in accordance with one or more aspects.

Referring now to FIG. 13, a system 1300 that facilitates a use of flexible transmit pattern in a wireless communication is illustrated. System 1300 may include a module 1302 for determining a location in time of a sub-frame when a SFN transmission for data will occur. A module 1304 for determining a first transmission pattern and a second transmission pattern for reference signals and a module 1306 for broadcasting information about the selected transmission pattern prior to use thereof. Modules 1302-1306 may be a processor or any electronic device and may be coupled to memory module 1308.

Figure 14:
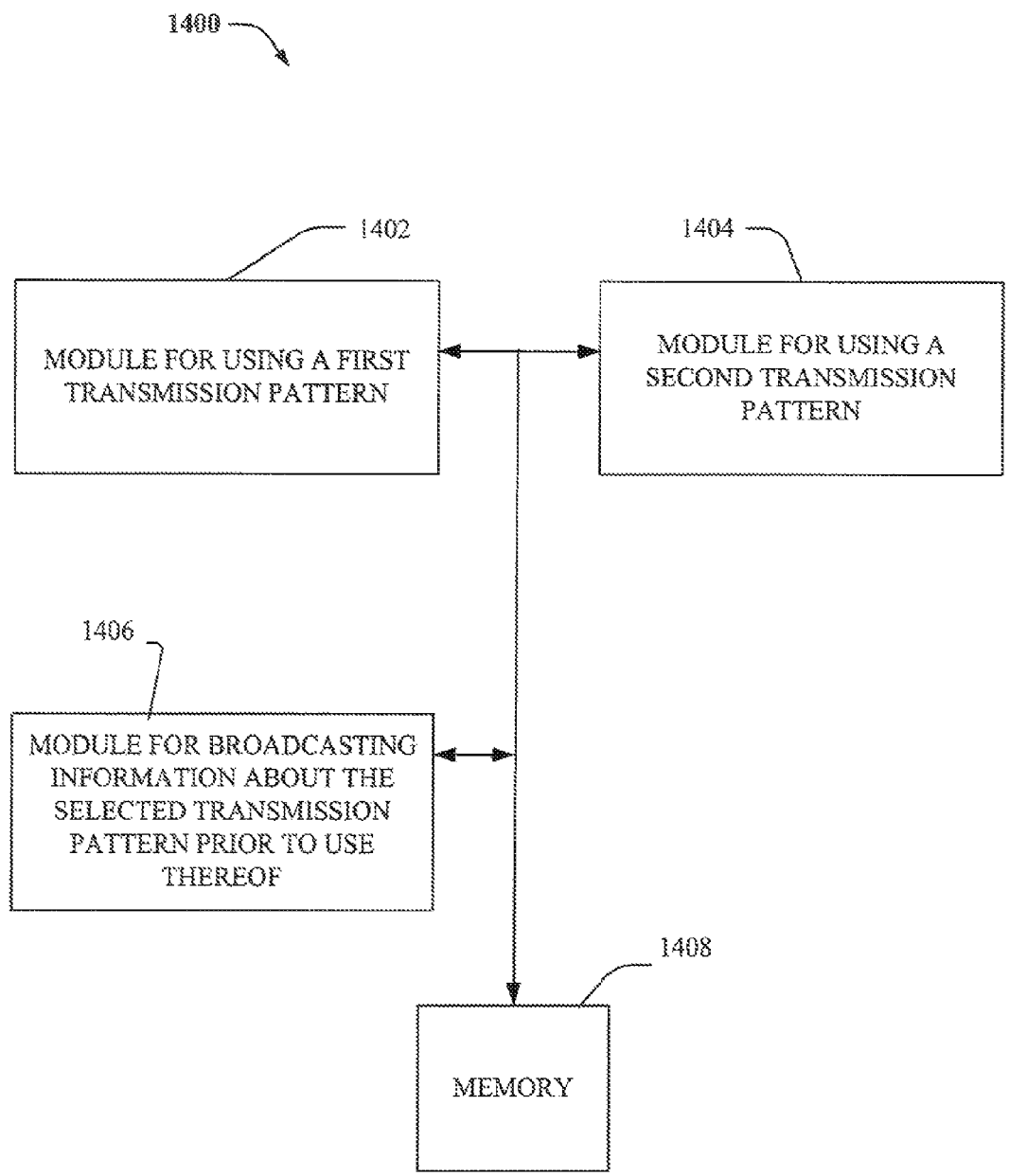
FIG. 14 depicts an exemplary system that facilitates a use of flexible transmit pattern technique in accordance with one or more aspects.

Referring now to FIG. 14, a system 1400 that facilitates a use of flexible transmit pattern in a wireless communication is illustrated. System 1400 may include a module 1402 for using a first transmission pattern, wherein the first transmission pattern comprises tones for transmitting a set of data according a single frequency network (SFN) transmission scheme. A module 1404 for using a second transmission pattern, wherein the second transmission pattern comprises tones for transmitting reference signals and a module 1406 for broadcasting information about the selected transmission pattern prior to use thereof. Modules 1402-1406 may be a processor or any electronic device and may be coupled to memory module 1408.

Figure 15:
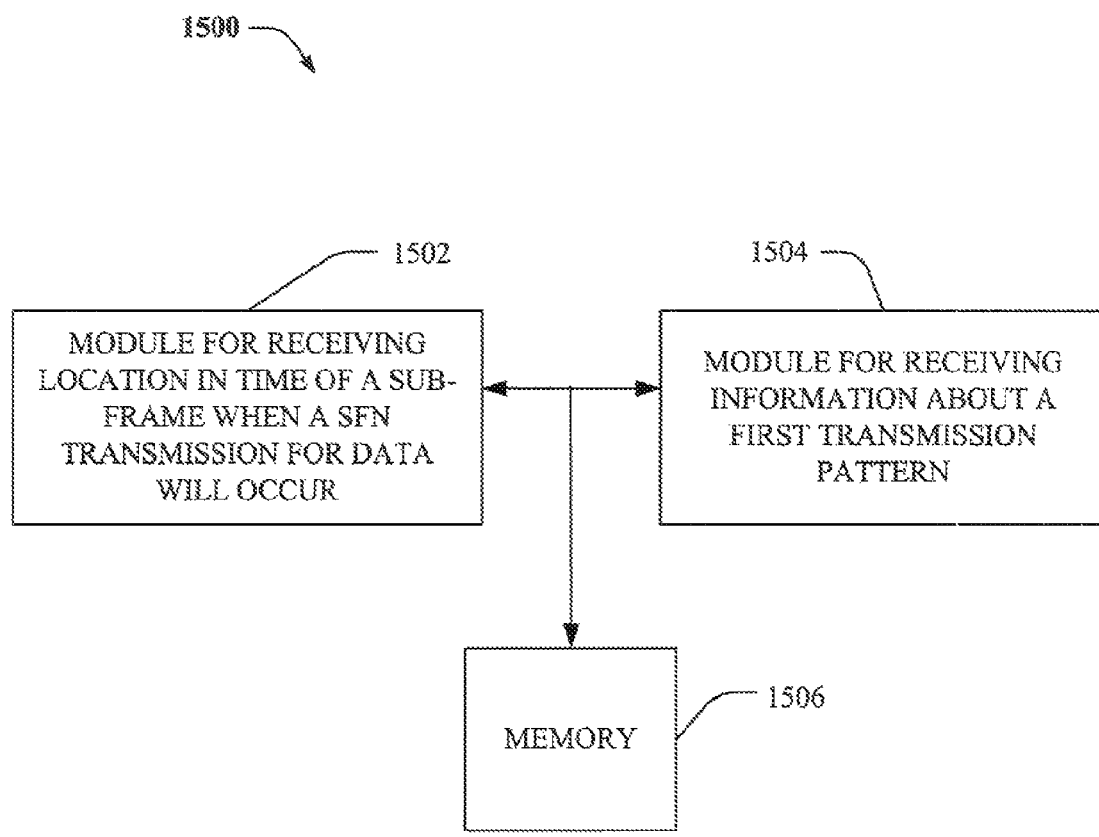
FIG. 15 depicts an exemplary system that facilitates a use of flexible transmit pattern technique in accordance with one or more aspects.

Referring now to FIG. 15, a system 1500 that facilitates a use of flexible transmit pattern in a wireless communication is illustrated. System 1500 may include a module 1502 for receiving location in time of a sub-frame when a SFN transmission for data will occur. System 1500 further includes a module 1504 for receiving information about a first transmission pattern, wherein the information comprises location information in time and frequency of at least one resource block used for transmitting a set of data according a single frequency network (SFN) transmission scheme. Modules 1502 and 1504 may be a processor or any electronic device and may be coupled to memory module 1506.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional work in a claim.

What is claimed is:

1. A method implemented in an apparatus and operable in wireless communication, the method comprising:
   determining a first transmission pattern and a second transmission pattern, wherein the first transmission pattern indicates symbols and tones to use to send a reference signal when single frequency network (SFN) transmission is sent, wherein the second transmission pattern indicates symbols and tones to use to send the reference signal when SFN transmission is not sent, and wherein the first and second transmission patterns are not transmitted;
   selecting a transmission pattern for use in a sub-frame, from among a plurality of transmission patterns comprising the first transmission pattern and the second transmission pattern, depending on whether SFN transmission of data will be transmitted in the sub-frame;
   broadcasting, via a message separate from the reference signal, information indicative of the selected transmission pattern prior to the sub-frame to convey use of the selected transmission pattern in the sub-frame; and
   sending the reference signal in the sub-frame at the symbols and tones indicated by the selected transmission pattern.

2. The method of claim 1, further comprising receiving information about the first and second transmission patterns.

3. The method of claim 1, further comprising broadcasting information about the first and second transmission patterns prior to use.

4. The method of claim 1, further comprising determining a third transmission pattern indicating symbols and tones allocated for transmitting data using an SFN transmission scheme.

5. The method of claim 4, further comprising broadcasting information about the third transmission pattern.

6. The method of claim 1, further comprising selecting the first transmission pattern if SFN transmission will be transmitted in the sub-frame.

7. The method of claim 1, wherein determining the first transmission pattern and the second transmission pattern comprises receiving parameters for the first transmission pattern and the second transmission pattern.

8. The method of claim 1, wherein the sub-frame is allocated for SFN transmission, and wherein broadcasting the information comprises transmitting location information of resource blocks in the sub-frame used for SFN transmission.

9. The method of claim 1, wherein the sub-frame is allocated for SFN transmission, and wherein broadcasting the information comprises transmitting the location in time of the sub-frame allocated for the SFN transmission.

10. The method of claim 1, wherein determining the first transmission pattern comprises receiving parameters of the first transmission pattern.

11. The method of claim 1, wherein selecting a transmission pattern comprise selecting the first transmission pattern from the plurality of transmission patterns.

12. The method of claim 11, wherein selecting the first transmission pattern comprises selecting the first transmission pattern wherein every symbol of a sub-frame contains a data tone for SFN transmission.

13. The method of claim 11, wherein selecting the first transmission pattern comprises selecting the first transmission pattern having one or more tones for the reference signal, wherein the tones for the reference signal are not adjacent.

14. The method of claim 11, wherein selecting the first transmission pattern comprises selecting the first transmission pattern having one or more tones for the reference signal, wherein the tones for the reference signal are adjacent.

15. The method of claim 1, further comprising receiving an indication to send SFN transmission for data.

16. The method of claim 1, wherein selecting a transmission pattern comprises selecting the first transmission pattern having tones allocated for transmitting data according to an SFN transmission scheme.

17. A method implemented in an apparatus and operable in wireless communication, the method comprising:
   determining a location in time of a sub-frame when a single frequency network (SFN) transmission for data will occur;
   determining a first transmission pattern to use for the sub-frame when the SFN transmission for data will occur, wherein the first transmission pattern indicates symbols and tones to use to send a reference signal, and wherein the first transmission pattern is not transmitted;
   broadcasting, via a message separate from the reference signal, information indicative of the first transmission pattern prior to the sub-frame to convey use of the first transmission pattern in the sub-frame; and
   sending the reference signal in the sub-frame at the symbols and tones indicated by the first transmission pattern.

18. The method of claim 17, further comprising receiving the location in time of the sub-frame when the SFN transmission for data will occur and the information about the first transmission pattern.

19. The method of claim 17, further comprising determining an SFN transmission pattern comprising location of tones within the sub-frame allocated for transmitting data using an SFN transmission scheme.

20. The method of claim 19, further comprising broadcasting information about the SFN transmission pattern prior to use.

21. The method of claim 20, wherein broadcasting the information about the SFN transmission pattern comprises transmitting location information, in time and frequency, about one or more resource blocks of the sub-frame used for transmitting the SFN transmission for data.

22. A method implemented in an apparatus and operable in wireless communication, the method comprising:
   using a first transmission pattern, wherein the first transmission pattern indicates symbols and tones to use for transmitting a set of data according to a single frequency network (SFN) transmission scheme;
   using a second transmission pattern, wherein the second transmission pattern indicates symbols and tones to use for transmitting a reference signal, and wherein the first and second transmission patterns are not transmitted;
   broadcasting, via a first message separate from the reference signal, information indicative of the second transmission pattern prior to use of the second transmission pattern; and
   sending the reference signal at the symbols and tones indicated by the second transmission pattern.

23. The method of claim 22, further comprising receiving location in time of a sub-frame when an SFN transmission for data will occur and information about the first transmission pattern.

24. The method of claim 22, further comprising determining a sub-frame which will use the first transmission pattern.

25. The method as claimed in claim 22, further comprising selecting the first transmission pattern from one or more transmission patterns.

26. The method as claimed in claim 22, further comprising selecting the first transmission pattern having tones allocated for transmitting data according to the SFN transmission scheme.

27. A method implemented in an apparatus and operable in wireless communication, the method comprising:
   determining a location in time of a sub-frame when a single frequency network (SFN) transmission for data will occur;
   receiving, via a message separate from a reference signal, information indicative of a first transmission pattern prior to the sub-frame, wherein the information conveys use of the first transmission pattern in the sub-frame, and wherein the first transmission pattern indicates symbols and tones used to send the reference signal when SFN transmission for data will occur; and
   receiving the reference signal in the sub-frame at the symbols and tones indicated by the first transmission pattern.

28. The method of claim 27, further comprising receiving location information in time and frequency of at least one resource block used for transmitting data according to an SFN transmission scheme.

29. The method of claim 27, further comprising processing one or more resource blocks based on the first transmission pattern.

30. The method of claim 29, wherein processing comprises determining if a current sub-frame contains data transmitted according to an SFN transmission scheme.

31. The method of claim 27, further comprising receiving an indication to use the first transmission pattern.

32. A method implemented in an apparatus and operable in wireless communication, the method comprising:
   receiving, via a message separate from a reference signal, information indicative of a first transmission pattern prior to a first sub-frame in which a single frequency network (SFN) transmission for data is sent, wherein the information conveys use of the first transmission pattern in the first sub-frame:
   receiving the reference signal at symbols and tones indicated by the first transmission pattern in the first sub-frame in which the SFN transmission for data is sent; and
   receiving the reference signal at symbols and tones indicated by a second transmission pattern in a second sub-frame when an SFN transmission for data is not sent, wherein the first and second transmission patterns are not transmitted.

33. The method of claim 32, further comprising receiving an indication to use the first transmission pattern in the first sub-frame.

34. The method of claim 32, further comprising determining if a current sub-frame contains data transmitted using an SFN transmission scheme.

35. The method of claim 32, further comprising receiving an indication to use the second transmission pattern in the second sub-frame.

36. An apparatus operable in wireless communication, the apparatus comprising:
  means for determining a first transmission pattern and a second transmission pattern, wherein the first transmission pattern indicates symbols and tones to use to send a reference signal when single frequency network (SFN) transmission is sent, wherein the second transmission pattern indicates symbols and tones to use to send the reference signal when SFN transmission is not sent, and wherein the first and second transmission patterns are not transmitted;
  means for selecting a transmission pattern for use in a sub-frame, from among a plurality of transmission patterns comprising the first transmission pattern and the second transmission pattern, depending on whether SFN transmission of data will be transmitted in the sub-frame;
  means for broadcasting, via a message separate from the reference signal, information indicative of the selected transmission pattern prior to the sub-frame to convey use of the selected transmission pattern in the sub-frame; and
  means for sending the reference signal in the sub-frame at the symbols and tones indicated by the selected transmission pattern.

37. The apparatus of claim 36, further comprising means for receiving information about the first and second transmission patterns.

38. The apparatus of claim 36, further comprising means for broadcasting information about the first and second transmission patterns prior to use.

39. The apparatus of claim 36, further comprising means for determining a third transmission pattern indicating symbols and tones allocated for transmitting data using an SFN transmission scheme.

40. The apparatus of claim 39, further comprising means for broadcasting information about the third transmission pattern.

41. The apparatus of claim 36, further comprising means for selecting the first transmission pattern if SFN transmission will be transmitted in the sub-frame.

42. The apparatus of claim 36, wherein means for determining the first transmission pattern and the second transmission pattern comprises means for receiving parameters for the first transmission pattern and the second transmission pattern.

43. The apparatus of claim 36, wherein the sub-frame is allocated for SFN transmission, and wherein means for broadcasting the information comprises means for transmitting location information of resource blocks in the sub-frame used for SFN transmission.

44. The apparatus of claim 36, wherein the sub-frame is allocated for SFN transmission, and wherein means for broadcasting the information comprises means for transmitting the location in time of the sub-frame allocated for the SFN transmission.

45. The apparatus of claim 36, wherein means for determining the first transmission pattern comprises means for receiving parameters of the first transmission pattern.

46. The apparatus of claim 36, wherein means for selecting a transmission pattern comprise means for selecting the first transmission pattern from the plurality of transmission patterns.

47. The apparatus of claim 46, wherein means for selecting the first transmission pattern comprises means for selecting the first transmission pattern wherein every symbol of a sub-frame contains a data tone for SFN transmission.

48. The apparatus of claim 46, wherein means for selecting the first transmission pattern comprises means for selecting the first transmission pattern having one or more tones for the reference signal, wherein the tones for the reference signal are not adjacent.

49. The apparatus of claim 46, wherein means for selecting the first transmission pattern comprises means for selecting the first transmission pattern having one or more tones for the reference signal, wherein the tones for the reference signal are adjacent.

50. The apparatus of claim 36, further comprising means for receiving an indication to send SFN transmission for data.

51. The apparatus of claim 36, wherein means for selecting a transmission pattern comprises means for selecting the first transmission pattern having tones allocated for transmitting data according to an SFN transmission scheme.

52. An apparatus operable in wireless communication, the apparatus comprising:
  means for determining a location in time of a sub-frame when a single frequency network (SFN) transmission for data will occur;
  means for determining a first transmission pattern to use for the sub-frame when the SFN transmission for data will occur, wherein the first transmission pattern indicates symbols and tones to use to send a reference signal, and wherein the first transmission pattern is not transmitted;
  means for broadcasting, via a message separate from the reference signal, information indicative of the first transmission pattern prior to the sub-frame to convey use of the first transmission pattern in the sub-frame; and
  means for sending the reference signal in the sub-frame at the symbols and tones indicated by the first transmission pattern.

53. The apparatus of claim 52, further comprising means for receiving the location in time of the sub-frame when the SFN transmission for data will occur and the information about the first transmission pattern.

54. The apparatus of claim 52, further comprising means for determining an SFN transmission pattern comprising location of tones within the sub-frame allocated for transmitting data using an SFN transmission scheme.

55. The apparatus of claim 54, further comprising means for broadcasting information about the SFN transmission pattern prior to use.

56. The apparatus of claim 55, wherein means for broadcasting the information about the SFN transmission pattern comprises means for transmitting location information, in time and frequency, about one or more resource blocks of the sub-frame used for transmitting the SFN transmission for data.

57. An apparatus operable in wireless communication, the apparatus comprising:
  means for using a first transmission pattern, wherein the first transmission pattern indicates symbols and tones to use for transmitting a set of data according to a single frequency network (SFN) transmission scheme;
  means for using a second transmission pattern, wherein the second transmission pattern indicates symbols and tones to use for transmitting a reference signal, wherein the first and second transmission patterns are not transmitted;
  means for broadcasting, via a first message separate from the reference signal, information indicative of the second transmission pattern prior to use of the second transmission pattern; and means for sending the reference signal at the symbols and tones indicated by the second transmission pattern.

58. The apparatus of claim 57, further comprising means for receiving location in time of a sub-frame when an SFN transmission for data will occur and information about the first transmission pattern.

59. The apparatus of claim 57, further comprising means for determining a sub-frame which will use the first transmission pattern.

60. The apparatus as claimed in claim 57, further comprising means for selecting the first transmission pattern from one or more transmission patterns.

61. The apparatus as claimed in claim 57, further comprising means for selecting the first transmission pattern having tones allocated for transmitting data according to the SFN transmission scheme.

62. An apparatus operable in wireless communication, the apparatus comprising:
means for determining a location in time of a sub-frame when a single frequency network (SFN) transmission for data will occur;
means for receiving, via a message separate from a reference signal, information indicative of a first transmission pattern prior to the sub-frame, wherein the information conveys use of the first transmission pattern in the sub-frame, and wherein the first transmission pattern indicates symbols and tones used to send the reference signal when SFN transmission for data will occur; and
means for receiving the reference signal in the sub-frame at the symbols and tones indicated by the first transmission pattern.

63. The apparatus of claim 62, further comprising means for receiving location information in time and frequency of at least one resource block used for transmitting data according to an SFN transmission scheme.

64. The apparatus of claim 62, further comprising means for processing one or more resource blocks based on the first transmission pattern.

65. The apparatus of claim 64, wherein means for processing comprises means for determining if a current sub-frame contains data transmitted according to an SFN transmission scheme.

66. The apparatus of claim 62, further comprising means for receiving an indication to use the first transmission pattern.

67. An apparatus operable in wireless communication, the apparatus comprising:
means for receiving, via a message separate from a reference signal, information indicative of a first transmission pattern prior to a first sub-frame in which a single frequency network (SFN) transmission for data is sent, wherein the information conveys use of the first transmission pattern in the first sub-frame;
means for receiving the reference signal at symbols and tones indicated by the first transmission pattern in the first sub-frame in which the SFN transmission for data is sent; and
means for receiving the reference signal at symbols and tones indicated by a second transmission pattern in a second sub-frame when an SFN transmission for data is not sent.

68. The apparatus of claim 67, further comprising means for receiving an indication to use the first transmission pattern in the first sub-frame.

69. The apparatus of claim 67, further comprising means for determining if a current sub-frame contains data transmitted using an SFN transmission scheme.

70. The apparatus of claim 67, further comprising means for receiving an indication to use the second transmission pattern in the second sub-frame.

71. A computer program product, comprising:
a non-transitory computer-readable medium comprising:
code for causing at least one computer to determine a first transmission pattern and a second transmission pattern, wherein the first transmission pattern indicates symbols and tones to use to send a reference signal when single frequency network (SFN) transmission is sent, wherein the second transmission pattern indicates symbols and tones to use to send the reference signal when SFN transmission is not sent, and wherein the first and second transmission patterns are not transmitted;
code for causing the at least one computer to select a transmission pattern for use in a sub-frame, from among a plurality of transmission patterns comprising the first transmission pattern and the second transmission pattern, depending on whether SFN transmission of data will be transmitted in the sub-frame;
code for causing the at least one computer to broadcast, via a message separate, from the reference signal, information indicative of the selected transmission pattern prior to the sub-frame to convey use of the selected transmission pattern in the sub-frame; and
code for causing the at least one computer to send the reference signal in the sub-frame at the symbols and tones indicated by the selected transmission pattern.

72. A computer program product, comprising:
a non-transitory computer-readable medium comprising:
code for causing at least one computer to determine a location in time of a sub-frame when a single frequency network (SFN) transmission for data will occur;
code for causing the at least one computer to determine a first transmission pattern to use for the sub-frame when the SFN transmission for data will occur, wherein the first transmission pattern indicates symbols and tones to use to send a reference signal, and wherein the first transmission pattern is not transmitted;
code for causing the at least one computer to broadcast, via a message separate from the reference signal, information indicative of the first transmission pattern prior to the sub-frame to convey use of the first transmission pattern in the sub-frame; and
code for causing the at least one computer to send the reference signal in the sub-frame at the symbols and tones indicated by the first transmission pattern.

73. A computer program product, comprising:
a non-transitory computer-readable medium comprising:
code for causing at least one computer to determine a location in time of a sub-frame when a single frequency network (SFN) transmission for data will occur;
code for causing the at least one computer to receive, via a message separate from a reference signal information indicative of a first transmission pattern prior to the sub-frame, wherein the information conveys use of the first transmission pattern in the sub-frame, and wherein the first transmission pattern indicates symbols and tones used to send the reference signal when SFN transmission for data will occur; and
code for causing the at least one computer to receive the reference signal in the sub-frame at the symbols and tones indicated by the first transmission pattern.

74. An apparatus operable in wireless communication, comprising:
  at least one processor configured to
    determine a first transmission pattern and a second transmission pattern, wherein the first transmission pattern indicates symbols and tones to use to send a reference signal when single frequency network (SFN) transmission is sent, wherein the second transmission pattern indicates symbols and tones to use to send the reference signal when SFN transmission is not sent, and wherein the first and second transmission patterns are not transmitted;
    select a transmission pattern for use in a sub-frame, from among a plurality of transmission patterns comprising the first transmission pattern and the second transmission pattern, depending on whether SFN transmission of data will be transmitted in the sub-frame;
    broadcast, via a message separate from the reference signal, information indicative of the selected transmission pattern prior to the sub-frame to convey use of the selected transmission pattern in the sub-frame; and
    send the reference signal in the sub-frame at the symbols and tones indicated by the selected transmission pattern.

75. An apparatus operable in wireless communication, comprising:
  at least one processor configured to
    determine a location in time of a sub-frame when a single frequency network (SFN) transmission for data will occur;
    determine a first transmission pattern to use for the sub-frame when the SFN transmission for data will occur, wherein the first transmission pattern indicates symbols and tones to use to send a reference signal, and wherein the first transmission pattern is not transmitted;
    broadcast, via a message separate from the reference signal, information indicative of the first transmission pattern prior to the sub-frame to convey use of the first transmission pattern in the sub-frame; and
    send the reference signal in the sub-frame at the symbols and tones indicated by the first transmission pattern.

76. An apparatus operable in wireless communication, comprising:
  at least one processor configured to
    determine a location in time of a sub-frame when a single frequency network (SFN) transmission for data will occur;
    receive, via a message separate from a reference signal, information indicative of a first transmission pattern prior to the sub-frame, wherein the information conveys use of the first transmission pattern in the sub-frame, and wherein the first transmission pattern indicates symbols and tones used to send the reference signal when SFN transmission for data will occur; and
    receiving the reference signal in the sub-frame at the symbols and tones indicated by the first transmission pattern.

77. A method operable in wireless communication, the method comprising:
  determining a location in time of a sub-frame when a single frequency network (SFN) transmission for data will occur;
  determining a first transmission pattern to use for the sub-frame when the SFN transmission for data will occur, wherein the first transmission pattern indicates symbols and tones to use to send reference signal and for null tones, and wherein the first transmission pattern is not transmitted;
  broadcasting, via a message separate from the reference signal, information indicative of the first transmission pattern prior to the sub-frame to convey use of the first transmission pattern in the sub-frame; and
  sending the reference signal in the sub-frame at the symbols and tones indicated by the first transmission pattern.

* * * * *